(12) United States Patent
Wolrich et al.

(10) Patent No.: US 9,658,854 B2
(45) Date of Patent: May 23, 2017

(54) INSTRUCTIONS AND LOGIC TO PROVIDE SIMD SM3 CRYPTOGRAPHIC HASHING FUNCTIONALITY

(71) Applicant: Intel Corporation, Santa Clara, CA (US)

(72) Inventors: Gilbert M. Wolrich, Framingham, MA (US); Vinodh Gopal, Westborough, MA (US); Sean M. Gulley, Boston, MA (US); Kirk S. Yap, Westborough, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 14/498,931

(22) Filed: Sep. 26, 2014

(65) Prior Publication Data

US 2016/0092688 A1    Mar. 31, 2016

(51) Int. Cl.
*G06F 21/60* (2013.01)
*G06F 9/30* (2006.01)
*G06F 21/72* (2013.01)

(52) U.S. Cl.
CPC .......... *G06F 9/30145* (2013.01); *G06F 21/72* (2013.01)

(58) Field of Classification Search
CPC ... G06F 12/1408; G06F 9/30145; G06F 21/72
(Continued)

(56) References Cited

U.S. PATENT DOCUMENTS

| 5,649,179 A | 7/1997 | Steenstra et al. |
| 2014/0019693 A1 | 1/2014 | Gulley et al. |

(Continued)

FOREIGN PATENT DOCUMENTS

TW    200945198 A1    11/2009

OTHER PUBLICATIONS

Notice of Allowance received for Taiwan Patent Application No. 104127017, mailed on May 27, 2016, 4 pages (1 page of English Translation and 3 pages of Taiwan Notice of Allowance).

(Continued)

*Primary Examiner* — William Powers
*Assistant Examiner* — Aubrey Wyszynski
(74) *Attorney, Agent, or Firm* — Vecchia Patent Agent, LLC

(57) ABSTRACT

Instructions and logic provide SIMD SM3 cryptographic hashing functionality. Some embodiments include a processor comprising: a decoder to decode instructions for a SIMD SM3 message expansion, specifying first and second source data operand sets, and an expansion extent. Processor execution units, responsive to the instruction, perform a number of SM3 message expansions, from the first and second source data operand sets, determined by the specified expansion extent and store the result into a SIMD destination register. Some embodiments also execute instructions for a SIMD SM3 hash round-slice portion of the hashing algorithm, from an intermediate hash value input, a source data set, and a round constant set. Processor execution units perform a set of SM3 hashing round iterations upon the source data set, applying the intermediate hash value input and the round constant set, and store a new hash value result in a SIMD destination register.

49 Claims, 29 Drawing Sheets

(58) Field of Classification Search
USPC .......................................................... 713/190
See application file for complete search history.

(56) References Cited

U.S. PATENT DOCUMENTS

| | | | |
|---|---|---|---|
| 2014/0189368 A1* | 7/2014 | Wolrich | G06F 21/64 |
| | | | 713/190 |
| 2014/0195782 A1 | 7/2014 | Yap et al. | |
| 2014/0362098 A1* | 12/2014 | Kerofsky | G06T 1/60 |
| | | | 345/547 |
| 2015/0043729 A1 | 2/2015 | Gopal et al. | |
| 2015/0067302 A1* | 3/2015 | Gueron | G06F 7/00 |
| | | | 712/210 |
| 2015/0186139 A1 | 7/2015 | Wolrich et al. | |
| 2015/0280917 A1 | 10/2015 | Wolrich et al. | |
| 2016/0070931 A1* | 3/2016 | Gueron | G06F 9/3016 |
| | | | 380/28 |

OTHER PUBLICATIONS

International Search Report and Written Opinion received for PCT Patent Application No. PCT/US2015/065134, mailed on Jul. 11, 2016, 19 pages.

\* cited by examiner

310 PACKED BYTE

320 PACKED WORD

330 PACKED DOUBLEWORD

341 PACKED HALF

342 PACKED SINGLE

343 PACKED DOUBLE

344 — UNSIGNED PACKED BYTE REPRESENTATION

345 — SIGNED PACKED BYTE REPRESENTATION

346 — UNSIGNED PACKED WORD REPRESENTATION

347 — SIGNED PACKED WORD REPRESENTATION

348 — UNSIGNED PACKED DOUBLEWORD REPRESENTATION

349 — SIGNED PACKED DOUBLEWORD REPRESENTATION

INSTRUCTIONS AND LOGIC TO PROVIDE SIMD SM3 CRYPTOGRAPHIC HASHING FUNCTIONALITY

FIELD OF THE DISCLOSURE

The present disclosure pertains to the field of processing logic, microprocessors, and associated instruction set architecture that, when executed by the processor or other processing logic, perform logical, mathematical, or other functional operations. In particular, the disclosure relates to instructions and logic to provide SIMD SM3 cryptographic hashing functionality.

BACKGROUND OF THE DISCLOSURE

A cryptographic hash function is a hash function, i.e. an algorithm that takes an arbitrary block of data and returns a fixed-size bit string, the (cryptographic) hash value, such that an (accidental or intentional) change to the data will (with very high probability) change the hash value. The data to be encoded are often called the "message," and the hash value is sometimes called the message digest or "digest."

Cryptographic hash functions have many information security applications, notably in digital signatures, message authentication codes (MACs), and other forms of authentication. They can also be used as ordinary hash functions, to index data in hash tables, for fingerprinting, to detect duplicate data or uniquely identify files, and as checksums to detect accidental data corruption. In information security contexts, cryptographic hash values are sometimes called (digital) fingerprints, checksums, or just hash values, even though all these terms stand for functions with rather different properties and purposes.

Two major tradeoffs in cryptographic hash function design, as visible to a programmer, are: (1) complexity of calculation—too simple and the hash is easily broken, too complex and the hash takes too long to calculate; and (2) size of output—too small and brute-force attacks are too easy, too big and the cost of storing and sending the hash value is too large. One of the most famous cryptographic hash functions is the MD5 (Message-Digest algorithm 5) algorithm developed by Ronald Rivest. Other common algorithms are SHA-1 (Secure Hash Algorithm 1) as well as variants SHA-2 and SHA-3 published by the National Institute of Standards and Technology (NIST) as a U.S. Federal Information Processing Standard (FIPS). Another cryptographic hash algorithm of interest, which was invented by Xiaoyun Wang et al., is the SM3 cryptographic hash function—published by the Chinese Commercial Cryptography Administration Office and submitted as an Internet-Draft to the Internet Engineering Task Force (IETF) for the use of electronic authentication service system.

Commonly, hardware acceleration for hash algorithms is not required, because they are not designed to be especially computationally demanding. But one special purpose dynamic password enciphering chip is produced by Shenzhen Tongfang Electronic Equipment Co., Ltd. of China, which implements the SM3 cryptographic hash algorithm in hardware.

Typical straightforward hardware implementations using lookup memories, truth tables, binary decision diagrams or field-programmable gate arrays (FPGAs) are costly in terms of circuit area. Alternative approaches using finite fields isomorphic to GF(256) may be efficient in area but may also be slower than the straightforward hardware implementations.

One drawback to a complete hardware approach is that it is not easily fit into a standard execution pipeline of a modern microprocessor without making special considerations for such things as the handling of interrupts specially, or the concurrent superscalar execution of other instructions. Another mismatch with standard execution pipelines is the latency required for executing an entire hashing algorithm.

Modern processors often include instructions to provide operations that are computationally intensive, but offer a high level of data parallelism that can be exploited through an efficient implementation using various data storage devices, such as for example, single instruction multiple data (SIMD) vector registers. The central processing unit (CPU) may then provide parallel hardware to support processing vectors. A vector is a data structure that holds a number of consecutive data elements. A vector register of size M may contain N vector elements of size O, where N=M/O. For instance, a 64-byte vector register may be partitioned into (a) 64 vector elements, with each element holding a data item that occupies 1 byte, (b) 32 vector elements to hold data items that occupy 2 bytes (or one "word") each, (c) 16 vector elements to hold data items that occupy 4 bytes (or one "doubleword") each, or (d) 8 vector elements to hold data items that occupy 8 bytes (or one "quadword") each. The nature of the parallelism in SIMD vector registers could be well suited for the handling of secure hashing algorithms.

To date, potential solutions to such complexities, mismatches, performance limiting issues, and other bottlenecks have not been adequately explored.

BRIEF DESCRIPTION OF THE DRAWINGS

The present invention is illustrated by way of example and not limitation in the figures of the accompanying drawings.

DETAILED DESCRIPTION

Figure 1A:
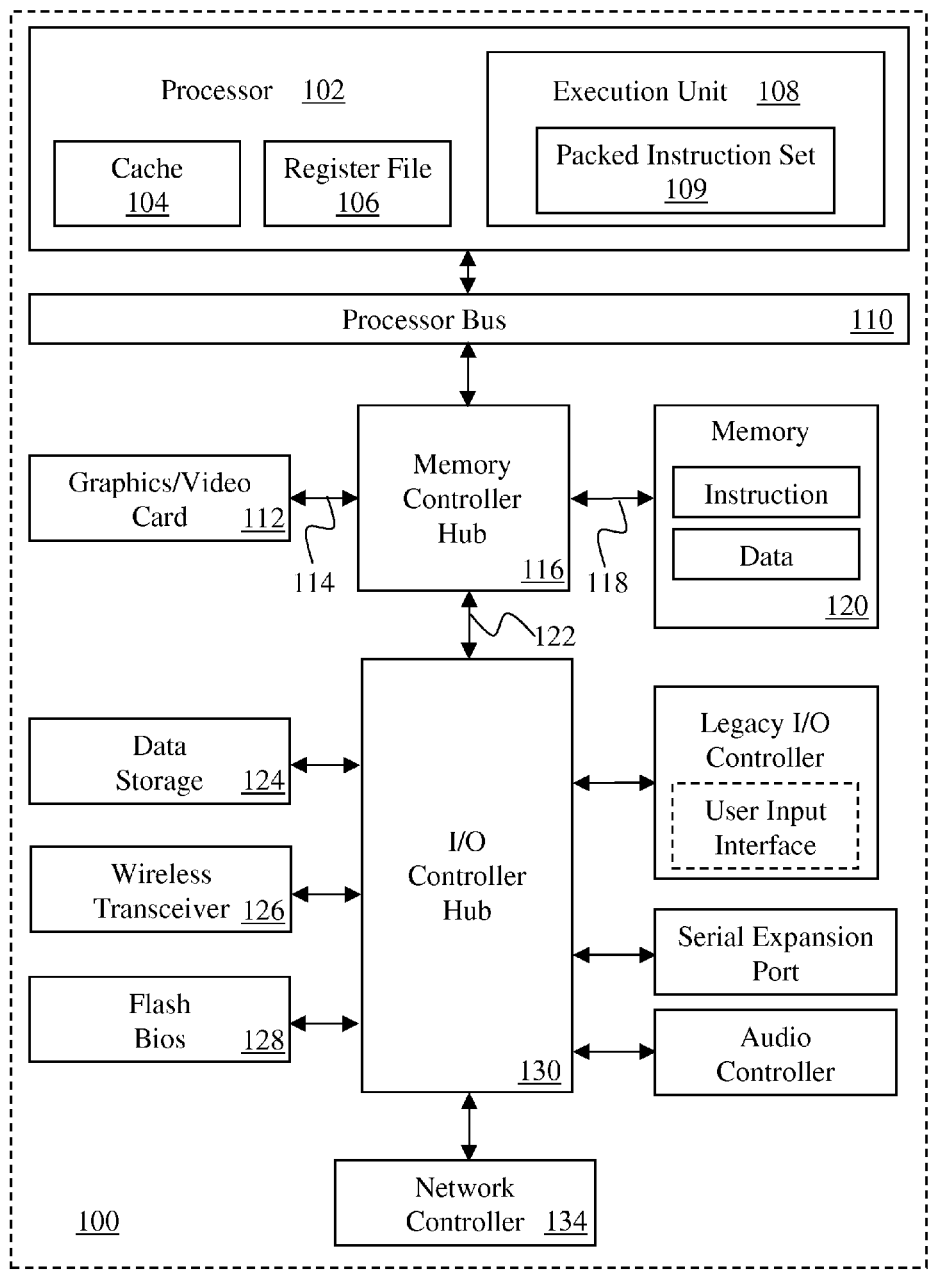
FIG. 1A is a block diagram of one embodiment of a system that executes instructions to provide SIMD SM3 cryptographic hashing functionality.

The following description discloses instructions and processing logic to provide SIMD SM3 cryptographic hashing functionality within or in association with a processor, computer system, or other processing apparatus. Some embodiments include a processor comprising a decoder to decode instructions for a SIMD SM3 message expansion, specifying first and second source data operand sets, and an expansion extent. Processor execution units, responsive to the instruction, perform a number of SM3 message expansions, from the first and second source data operand sets, determined by the specified expansion extent and store the result into a SIMD destination register. Some embodiments also execute instructions for a SIMD SM3 hash round-slice portion of the hashing algorithm, from an intermediate hash value input, a source data set, and a round constant set. Processor execution units perform a set of SM3 hashing round iterations upon the source data set, applying the intermediate hash value input and the round constant set, and store a new hash value result in a SIMD destination register. Details of the SM3 cryptographic hash algorithm may be found in "SM3 Hash Function," IETF Internet-Draft, Chinese Academy of Science, 14 Feb. 2014, version 01, available on the world-wide-web at tools.ietf.org/pdf/draft-shen-sm3-hash-01.pdf.

It will be appreciated that SIMD SM3 cryptographic hashing instructions may be used to provide SIMD SM3 cryptographic hashing functionality in applications, such as cryptographic protocols and Internet communication to assure data integrity, digital signatures, identity verification, message content authentication and message origin authentication for financial transactions, electronic commerce, electronic mail, software distribution, data storage, random number generation, etc.

For some embodiments of SIMD instructions and processing logic to provide SM3 cryptographic hashing functionality, SM3 message expansion and SM3 cryptographic hash rounds may be performed in slices of iterations concurrently and/or in parallel in a standard execution pipeline of a modern microprocessor. It will be appreciated that the number of iterations per slice may be conveniently chosen so as to provide a sufficient cover for other concurrent in-flight instructions by the latencies associated with performing a slice of SM3 message expansions and/or a slice of SM3 cryptographic hash rounds. Thus it will also be appreciated that providing execution of an instruction for a SIMD SM3 cryptographic hashing algorithm round slice, which has a number of iterations (e.g. two, four or eight iterations per slice) but less that the total number of round iterations of the hash algorithm, permits concurrent execution of such other required instructions (e.g. SM3 message expansion instructions) in a superscalar execution pipeline, and/or in an out-of-order processor pipeline, thereby significantly improving processing throughput for a large number of applications, and leveraging the scaling of frequencies for fabrication process improvements associated with general purpose processors.

In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of data and/or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
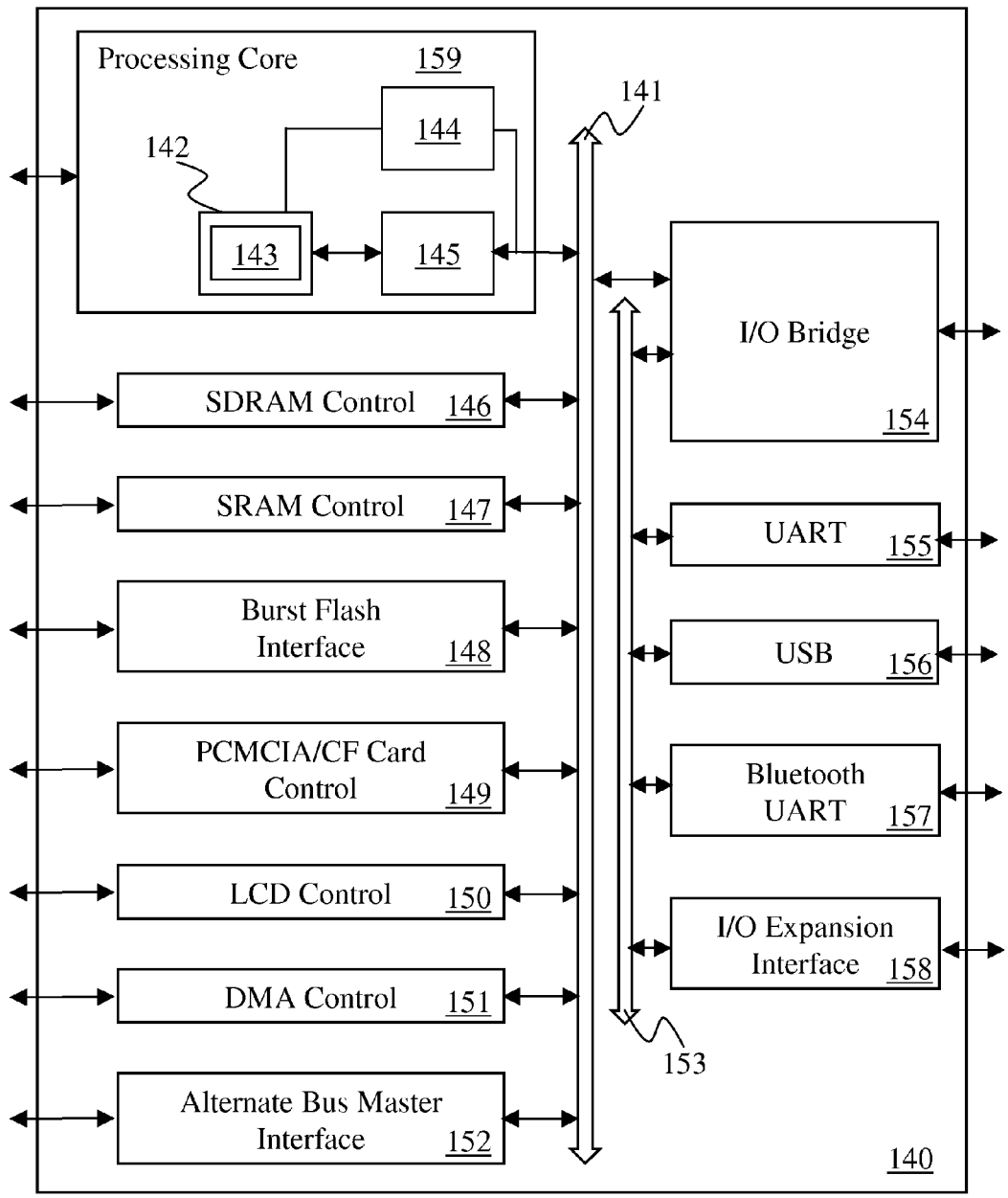
FIG. 1B is a block diagram of another embodiment of a system that executes instructions to provide functionality.

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention.

Computer system 140 comprises a processing core 159 capable of performing at least one instruction in accordance with one embodiment. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
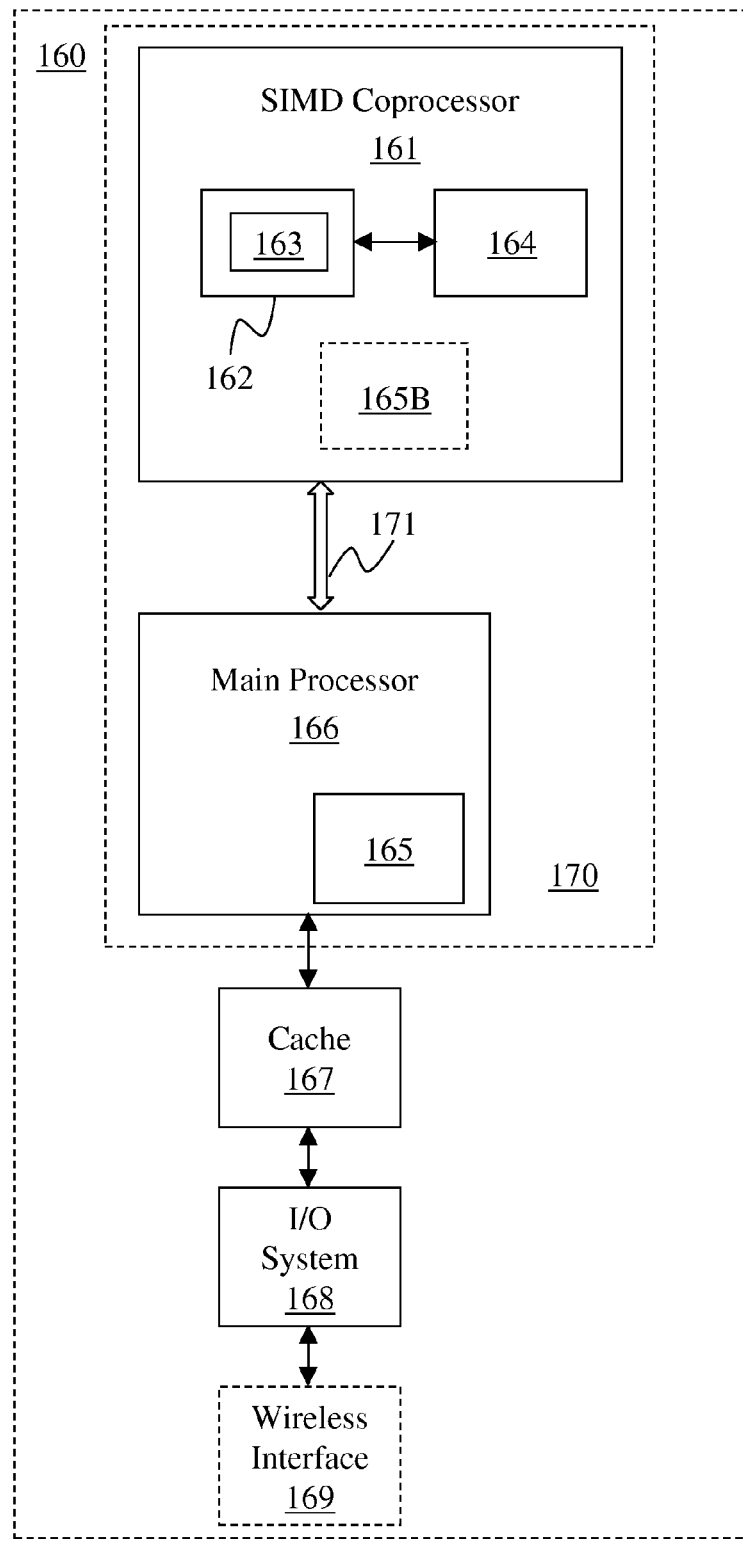
FIG. 1C is a block diagram of another embodiment of a system that executes instructions to provide SIMD SM3 cryptographic hashing functionality.

FIG. 1C illustrates another alternative embodiments of a data processing system capable of executing instructions to provide SIMD SM3 cryptographic hashing functionality. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 166 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 171 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
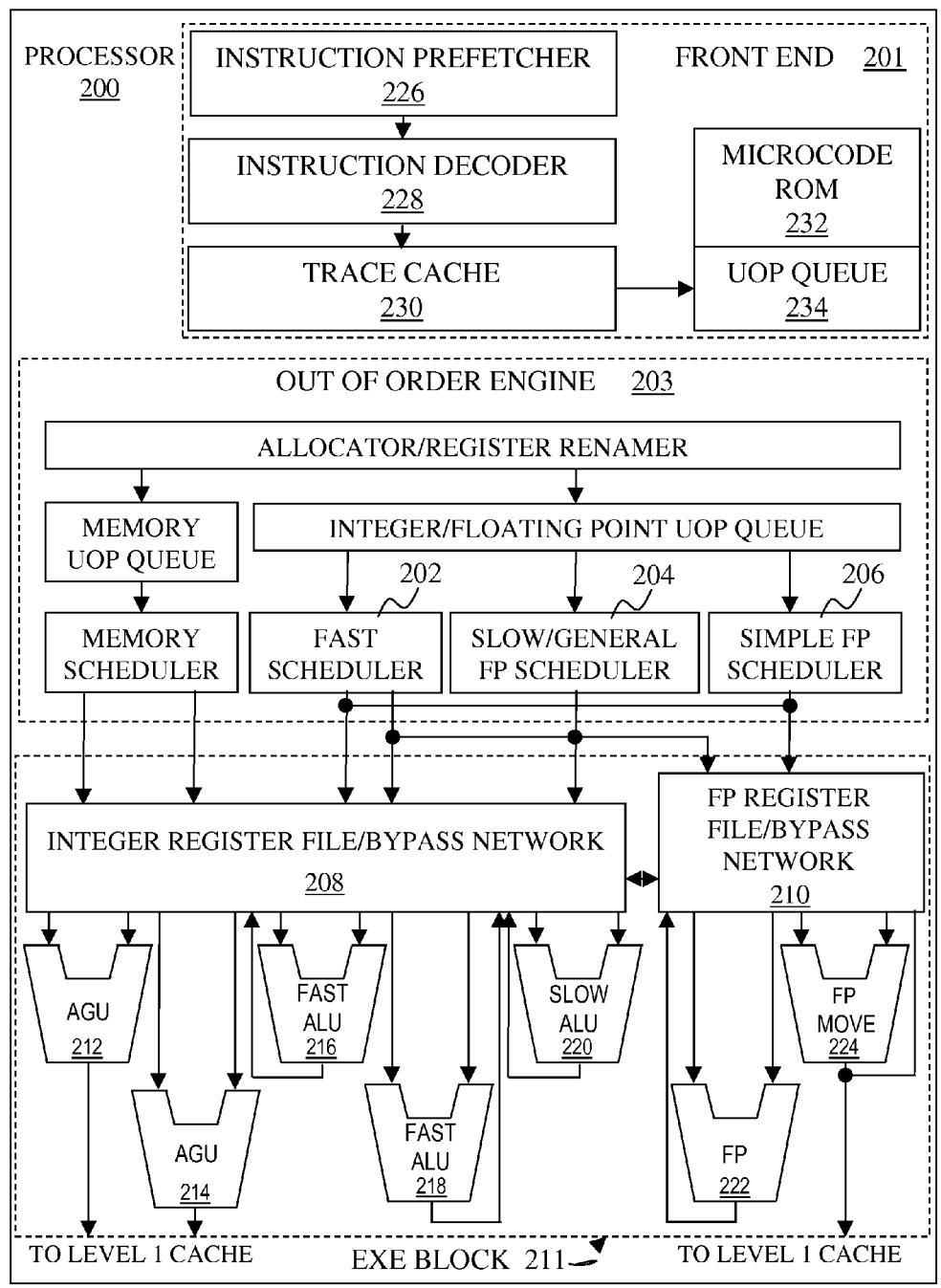
FIG. 2 is a block diagram of one embodiment of a processor that executes instructions to provide SIMD SM3 cryptographic hashing functionality.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "microinstructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the microinstructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instructions that provide SIMD SM3 cryptographic hashing functionality.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3A:
FIG. 3A illustrates packed data types according to one embodiment.
Figure 3A:
Figure 3A:

In the examples of the following figures, a number of data operands are described. FIG. 3A illustrates various packed data type representations in multimedia registers according to one embodiment of the present invention. FIG. 3A illustrates data types for a packed byte 310, a packed word 320, and a packed doubleword (dword) 330 for 128 bits wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide, 256 bit wide, 512 bit wide, or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

Figure 3B:
FIG. 3B illustrates packed data types according to one embodiment.
Figure 3B:
Figure 3B:

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits, 512-bits or more.

Figure 3C:
FIG. 3C illustrates packed data types according to one embodiment.
Figure 3C:
Figure 3C:
Figure 3C:
Figure 3C:
Figure 3C:

FIG. 3C illustrates various signed and unsigned packed data type representations in multimedia registers according to one embodiment of the present invention. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, etc., and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element.

Figure 3D:
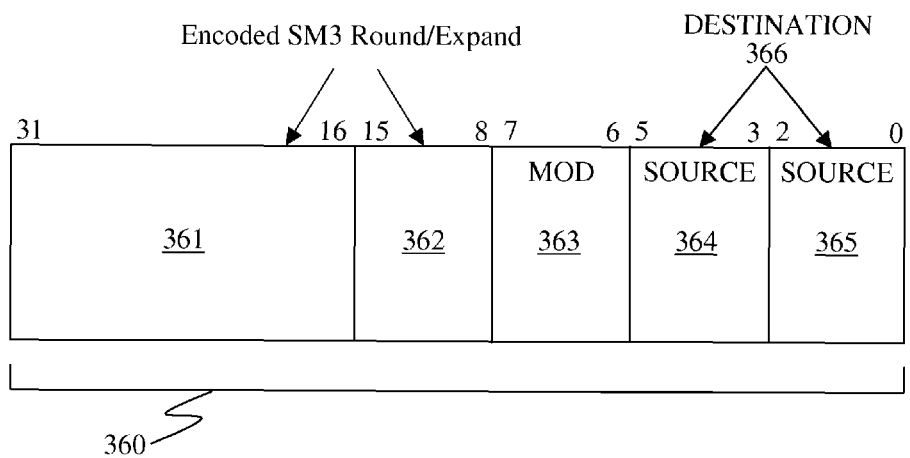
FIG. 3D illustrates an instruction encoding to provide SIMD SM3 cryptographic hashing functionality according to one embodiment.

FIG. 3D is a depiction of one embodiment of an operation encoding (opcode) format 360, having thirty-two or more bits, and register/memory operand addressing modes corresponding with a type of opcode format described in the "Intel® 64 and IA-32 Intel Architecture Software Developer's Manual Combined Volumes 2A and 2B: Instruction Set Reference A-Z," which is which is available from Intel Corporation, Santa Clara, Calif. on the world-wide-web (www) at intel.com/products/processor/manuals/. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different. In one embodiment, one of the source operands identified by source operand identifiers 364 and 365 is overwritten by the results of the instruction, whereas in other embodiments identifier 364 corresponds to a source register element and identifier 365 corresponds to a destination register element. For one embodiment, operand identifiers 364 and 365 may be used to identify 32-bit or 64-bit source and destination operands.

Figure 3E:
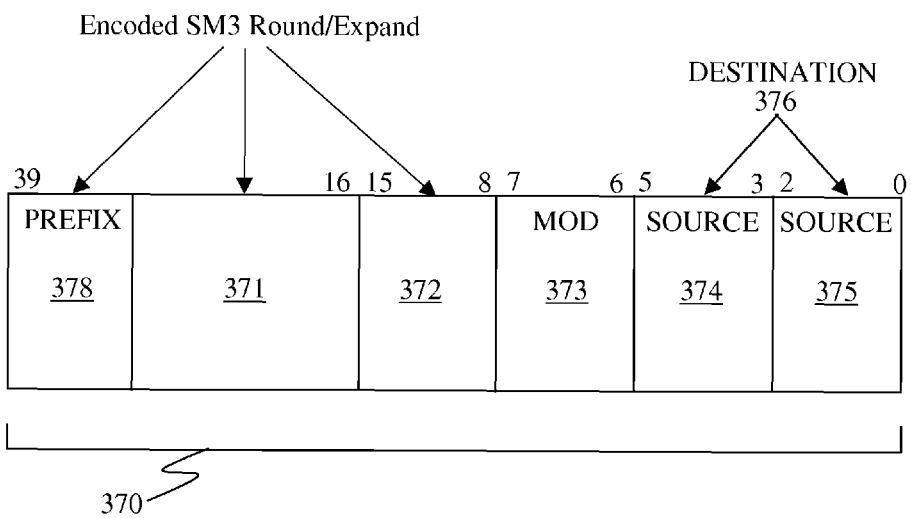
FIG. 3E illustrates an instruction encoding to provide SIMD SM3 cryptographic hashing functionality according to another embodiment.

FIG. 3E is a depiction of another alternative operation encoding (opcode) format 370, having forty or more bits. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
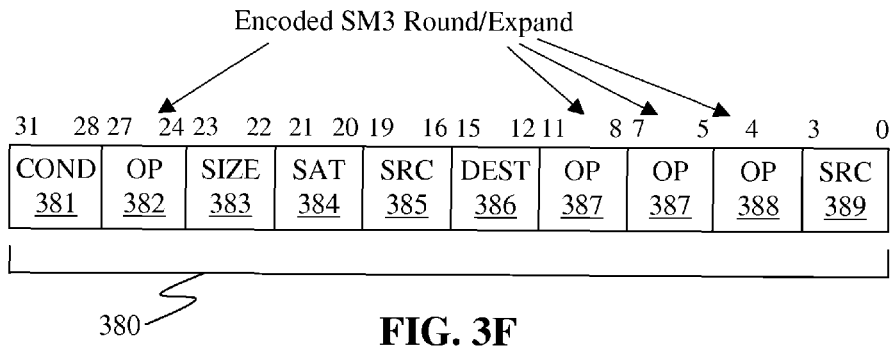
FIG. 3F illustrates an instruction encoding to provide SIMD SM3 cryptographic hashing functionality according to another embodiment.

Turning next to FIG. 3F, in some alternative embodiments, 64-bit (or 128-bit, or 256-bit, or 512-bit or more) single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

Figure 3G:
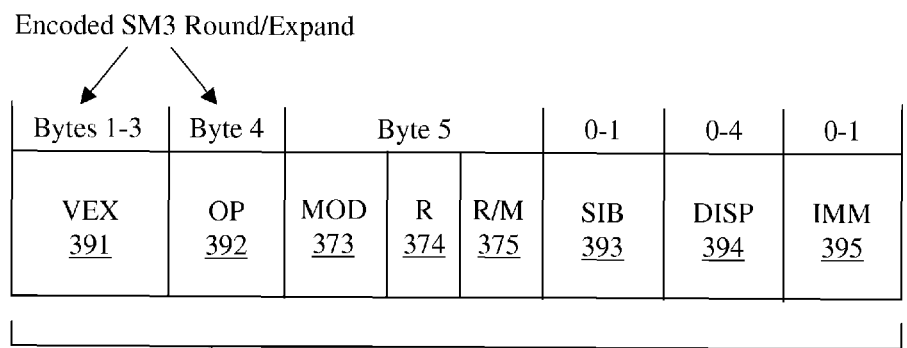
FIG. 3G illustrates an instruction encoding to provide SIMD SM3 cryptographic hashing functionality according to another embodiment.

Turning next to FIG. 3G is a depiction of another alternative operation encoding (opcode) format 397, to provide SIMD SM3 cryptographic hashing functionality according to another embodiment, corresponding with a type of opcode format described in the "Intel® Advanced Vector Extensions Programming Reference," which is available from Intel Corp., Santa Clara, Calif. on the world-wide-web (www) at intel.com/products/processor/manuals/.

The original x86 instruction set provided for a 1-byte opcode with various formats of address syllable and immediate operand contained in additional bytes whose presence was known from the first "opcode" byte. Additionally, there were certain byte values that were reserved as modifiers to the opcode (called prefixes, as they had to be placed before the instruction). When the original palette of 256 opcode bytes (including these special prefix values) was exhausted, a single byte was dedicated as an escape to a new set of 256 opcodes. As vector instructions (e.g., SIMD) were added, a need for more opcodes was generated, and the "two byte" opcode map also was insufficient, even when expanded through the use of prefixes. To this end, new instructions were added in additional maps which use 2 bytes plus an optional prefix as an identifier.

Additionally, in order to facilitate additional registers in 64-bit mode, an additional prefix may be used (called "REX") in between the prefixes and the opcode (and any escape bytes necessary to determine the opcode). In one embodiment, the REX may have 4 "payload" bits to indicate use of additional registers in 64-bit mode. In other embodiments it may have fewer or more than 4 bits. The general format of at least one instruction set (which corresponds generally with format 360 and/or format 370) is illustrated generically by the following:

[prefixes] [rex] escape [escape2] opcode modrm (etc.)

Opcode format 397 corresponds with opcode format 370 and comprises optional VEX prefix bytes 391 (beginning with C4 hex in one embodiment) to replace most other commonly used legacy instruction prefix bytes and escape codes. For example, the following illustrates an embodiment using two fields to encode an instruction, which may be used when a second escape code is present in the original instruction, or when extra bits (e.g, the XB and W fields) in the REX field need to be used. In the embodiment illustrated below, legacy escape is represented by a new escape value, legacy prefixes are fully compressed as part of the "payload" bytes, legacy prefixes are reclaimed and available for future expansion, the second escape code is compressed in a "map" field, with future map or feature space available, and new features are added (e.g., increased vector length and an additional source register specifier).

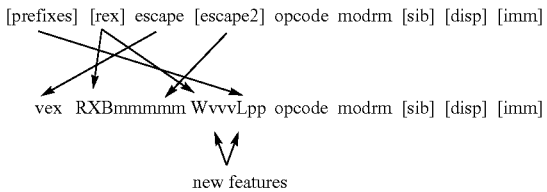

An instruction according to one embodiment may be encoded by one or more of fields 391 and 392. Up to four operand locations per instruction may be identified by field 391 in combination with source operand identifiers 374 and 375 and in combination with an optional scale-index-base (SIB) identifier 393, an optional displacement identifier 394, and an optional immediate byte 395. For one embodiment, VEX prefix bytes 391 may be used to identify 32-bit or 64-bit source and destination operands and/or 128-bit or 256-bit SIMD register or memory operands. For one embodiment, the functionality provided by opcode format 397 may be redundant with opcode format 370, whereas in other embodiments they are different. Opcode formats 370 and 397 allow register to register, memory to register, register by memory, register by register, register by immediate, register to memory addressing specified in part by MOD field 373 and by optional (SIB) identifier 393, an optional displacement identifier 394, and an optional immediate byte 395.

Figure 3H:
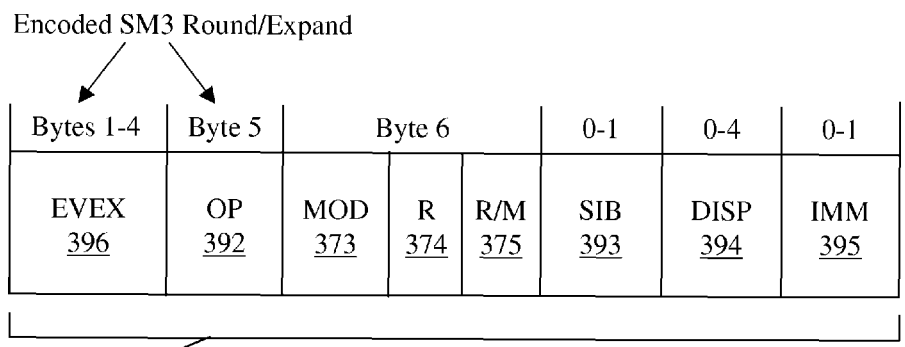
FIG. 3H illustrates an instruction encoding to provide SIMD SM3 cryptographic hashing functionality according to another embodiment.

Turning next to FIG. 3H is a depiction of another alternative operation encoding (opcode) format 398, to provide SIMD SM3 cryptographic hashing functionality according to another embodiment. Opcode format 398 corresponds with opcode formats 370 and 397 and comprises optional EVEX prefix bytes 396 (beginning with 62 hex in one embodiment) to replace most other commonly used legacy instruction prefix bytes and escape codes and provide additional functionality. An instruction according to one embodiment may be encoded by one or more of fields 396 and 392. Up to four operand locations per instruction and a mask may be identified by field 396 in combination with source operand identifiers 374 and 375 and in combination with an optional scale-index-base (SIB) identifier 393, an optional displacement identifier 394, and an optional immediate byte 395. For one embodiment, EVEX prefix bytes 396 may be used to identify 32-bit or 64-bit source and destination operands and/or 128-bit, 256-bit or 512-bit SIMD register or memory operands. For one embodiment, the functionality provided by opcode format 398 may be redundant with opcode formats 370 or 397, whereas in other embodiments they are different. Opcode format 398 allows register to register, memory to register, register by memory, register by register, register by immediate, register to memory addressing, with masks, specified in part by MOD field 373 and by optional (SIB) identifier 393, an optional displacement identifier 394, and an optional immediate byte 395. The general format of at least one instruction set (which corresponds generally with format 360 and/or format 370) is illustrated generically by the following:

evex1 RXBmmmmm WvvvLpp evex4 opcode modrm [sib] [disp] [imm]

For one embodiment an instruction encoded according to the EVEX format 398 may have additional "payload" bits that may be used to provide SIMD SM3 cryptographic hashing functionality with additional new features such as, for example, a user configurable mask register, or an additional operand, or selections from among 128-bit, 256-bit or 512-bit vector registers, or more registers from which to select, etc.

For example, where VEX format 397 may be used to provide SIMD SM3 cryptographic hashing functionality with an implicit mask, the EVEX format 398 may be used to provide SIMD SM3 cryptographic hashing functionality with an explicit user configurable mask. Additionally, where VEX format 397 may be used to provide SIMD SM3 cryptographic hashing functionality on 128-bit or 256-bit vector registers, EVEX format 398 may be used to provide SIMD SM3 cryptographic hashing functionality on 128-bit, 256-bit, 512-bit or larger (or smaller) vector registers.

Example instructions to provide SIMD SM3 cryptographic hashing functionality are illustrated by the following examples:

| Instruction | source1/destination | source2 | source3 | source4 | description |
|---|---|---|---|---|---|
| SM3-round-I4 | Ymm1 | Ymm2 | Ymm3 | Imm8 | Perform four iterations of the SM3 rounds indicated by Imm8 using the 256-bit starting state A, B, C, D, E, F, G, H, in Ymm1, the eight 32-bit message words Wj in Ymm2, and either one or four precalculated 32-bit constants Tj in Ymm3. Store the 256-bit resulting state in Ymm1. |
| SM3-round-I2 | Zmm1 | Zmm2 | Zmm3 | Imm8 | Perform two iterations of the SM3 rounds indicated by Imm8 in each 256-bit lane, using two 256-bit starting states A, B, C, D, E, F, G, H in Zmm1, two sets of eight 32-bit message words Wj in Zmm2, and either one or two precalculated 32-bit constants Tj from each lane in Zmm3. Store two 256-bit resulting states in Zmm1. |
| SM3-rounds | Ymm1 | Ymm2 | Imm8 | | Perform a number of iterations of the SM3 rounds (0-63) indicated by Imm8 using the 256-bit starting state A, B, C, D, E, F, G, H, in Ymm1, and eight 32-bit message words Wj in Ymm2. Store the 256-bit resulting state in Ymm1. |
| SM3-expand-J4 | Ymm1 | Ymm2 | Ymm3 | | Perform four SM3 message expansions using eight 32-bit message words Wj in Ymm2, and eight 32-bit message words Wj in Ymm3. Store the four latest and the four new message words Wj in Vmm1. |
| SM3-expand-J2 | Zmm1 | Zmm2 | Zmm3 | | Perform two SM3 message expansions, in each 256-bit lane, using eight 32-bit message words Wj in Zmm2, and eight 32-bit message words Wj in Zmm3. Store six latest and two new message words Wj in each 256-bit lane of Zmm1. |

It will be appreciated that SIMD SM3 cryptographic hashing instructions, as in the examples above, may be used to provide SIMD SM3 cryptographic hashing functionality in applications, such as cryptographic protocols and Internet communication to assure data integrity, digital signatures, identity verification, message content authentication and message origin authentication for financial transactions, electronic commerce, electronic mail, software distribution, data storage, random number generation, and so on.

It will also be appreciated that providing SIMD SM3 cryptographic hashing instructions, which perform a pre-specified number of iterations of the hashing round, may enable SIMD execution of the hashing algorithm in a processor pipeline concurrently with other SIMD processing and scalar processing, such as preprocessing of message "chunks" and preparing pre-rotated round constants (e.g. $T_j<<<j$) according to the specific hashing algorithm implementation. That is to say that, where a single iteration of a hashing round may have a pipeline latency of three cycles (e.g. 3 cycles per round), by bypassing results back through the pipeline, two iterations may have a latency of only four cycles (e.g. 2 cycles per round), four iterations may have a latency of only six cycles (e.g. 1.5 cycles per round). During those pipeline latencies of four or six cycles, other useful processing may be performed in parallel or concurrently with the hashing round slice. Thus providing an instruction for a SIMD secure hashing algorithm round slice, which has a number of iterations (e.g. two, four or eight iterations per slice) but less that the total number of round iterations of the hash algorithm, permits concurrent execution of other instructions in a superscalar execution pipeline, and/or an out-of-order processor pipeline, thereby significantly improving processing throughput, and leveraging the scaling of frequencies for fabrication process improvements associated with general purpose processors.

Some embodiments include a processor comprising a decoder to decode instructions for a SIMD SM3 message expansion, specifying first and second source data operand sets, and an expansion extent. Processor execution units, responsive to the instruction, perform a number of SM3 message expansions, from the first and second source data operand sets, determined by the specified expansion extent and store the result into a SIMD destination register. Some embodiments also execute instructions for a SIMD SM3 hash round-slice portion of the hashing algorithm, from an intermediate hash value input, a source data set, and a round constant set (e.g. having one or more pre-rotated constant $T_j<<<j$). Processor execution units perform a set of SM3 hashing round iterations upon the source data set, applying the intermediate hash value input and the round constant set, and store a new hash value result in a SIMD destination register.

For some embodiments of SIMD instructions and processing logic to provide SM3 cryptographic hashing functionality, both SM3 message expansion and SM3 cryptographic hash rounds may be performed in slices of iterations concurrently and/or in parallel in a standard execution pipeline of a modern microprocessor. It will be appreciated that the number of iterations per slice may be conveniently chosen so as to provide a sufficient cover for other concurrent in-flight instructions by the latencies associated with performing a slice of SM3 message expansions and/or a slice of SM3 cryptographic hash rounds. Thus it will also be appreciated that providing execution of an instruction for a SIMD SM3 cryptographic hashing algorithm round slice, which has a number of iterations (e.g. two, four or eight iterations per slice) but less that the total number of round iterations of the hash algorithm, permits concurrent execution of such other required instructions (e.g. SM3 message expansion instructions) in a superscalar execution pipeline, and/or in an out-of-order processor pipeline, thereby significantly improving processing throughput for a large number of applications, and leveraging the scaling of frequencies for fabrication process improvements associated with general purpose processors.

Figure 4A:
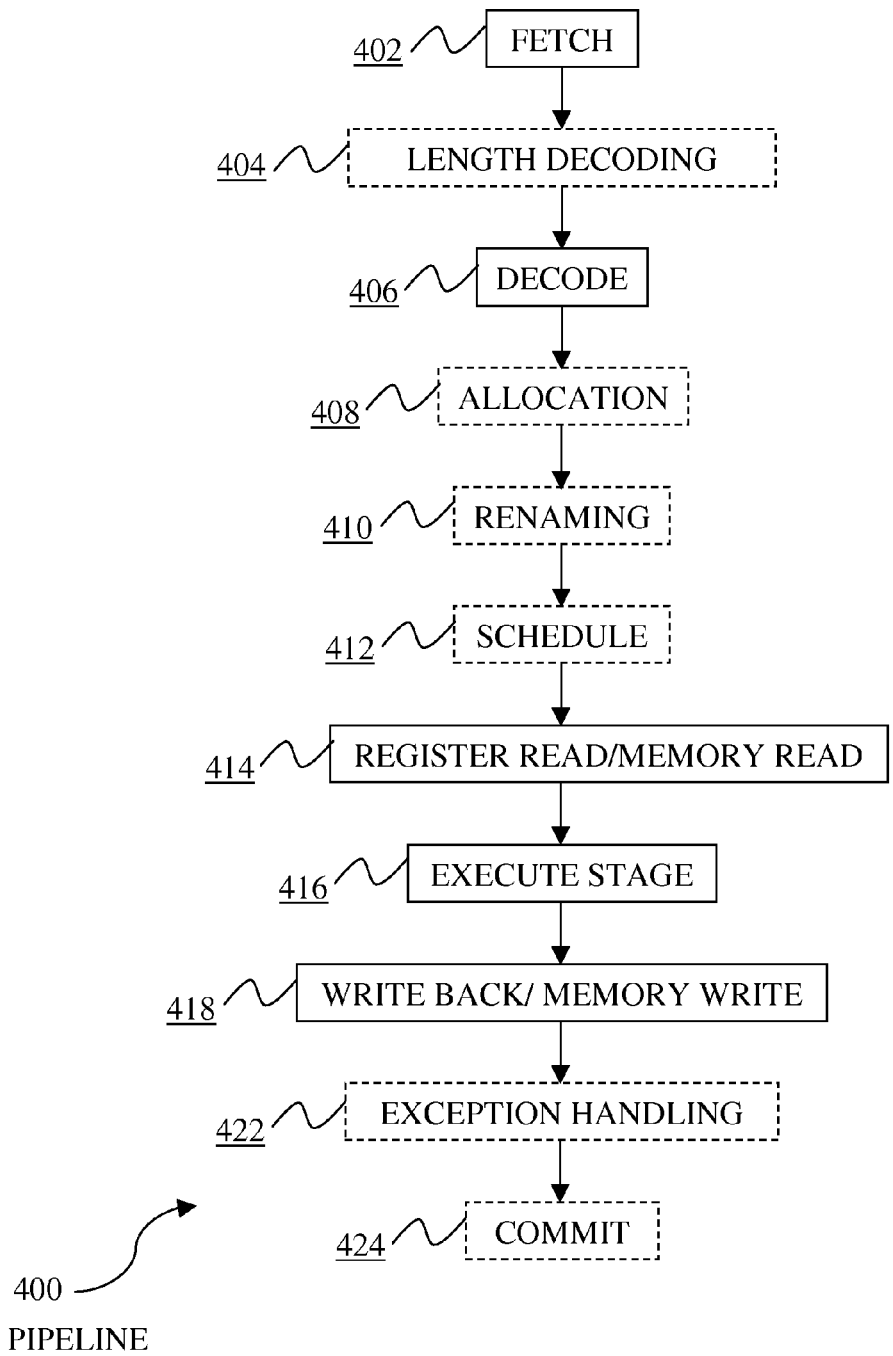
FIG. 4A illustrates elements of one embodiment of a processor micro-architecture to execute instructions that provide SIMD SM3 cryptographic hashing functionality.
Figure 4B:
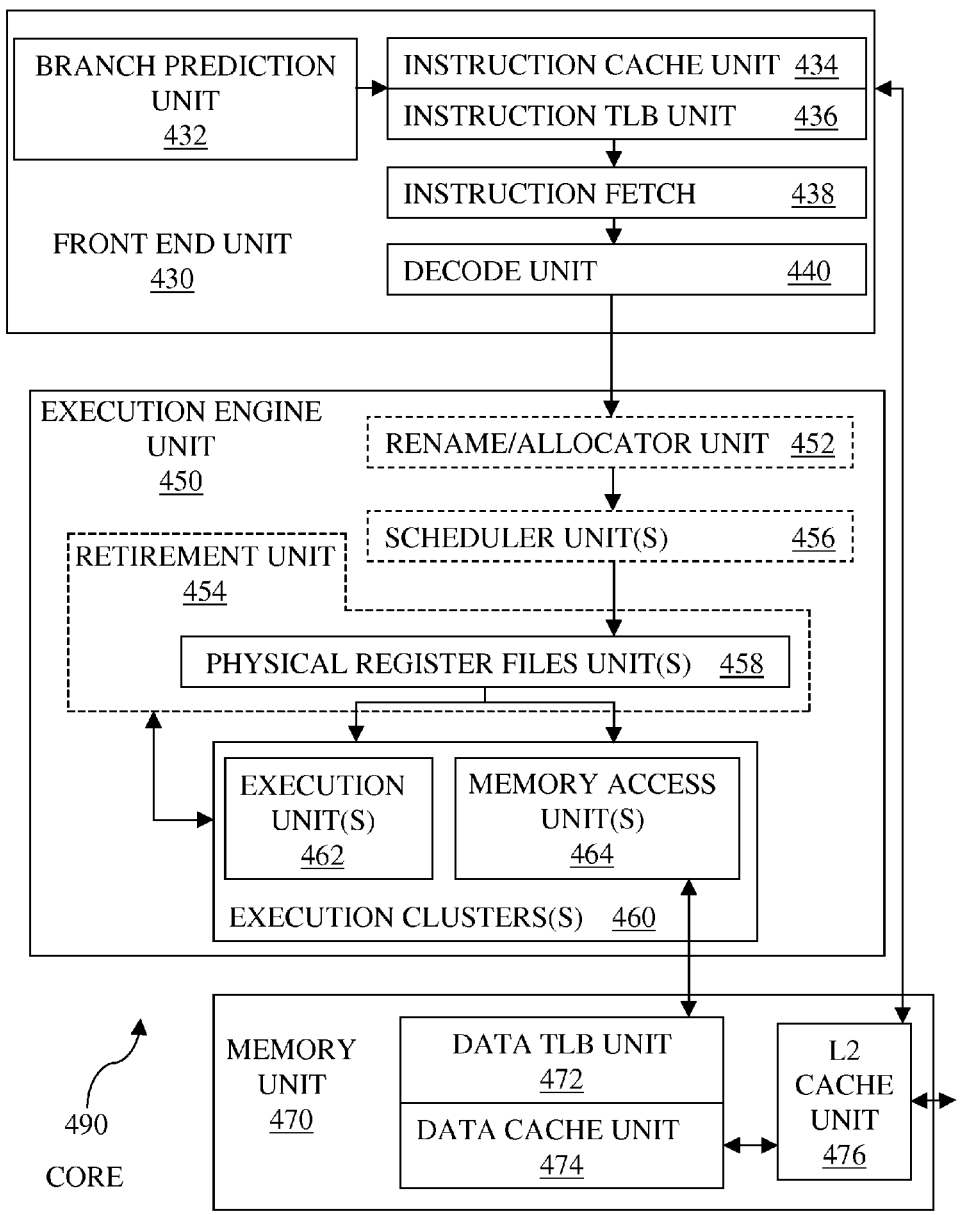
FIG. 4B illustrates elements of another embodiment of a processor micro-architecture to execute instructions that provide SIMD SM3 cryptographic hashing functionality.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster, and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
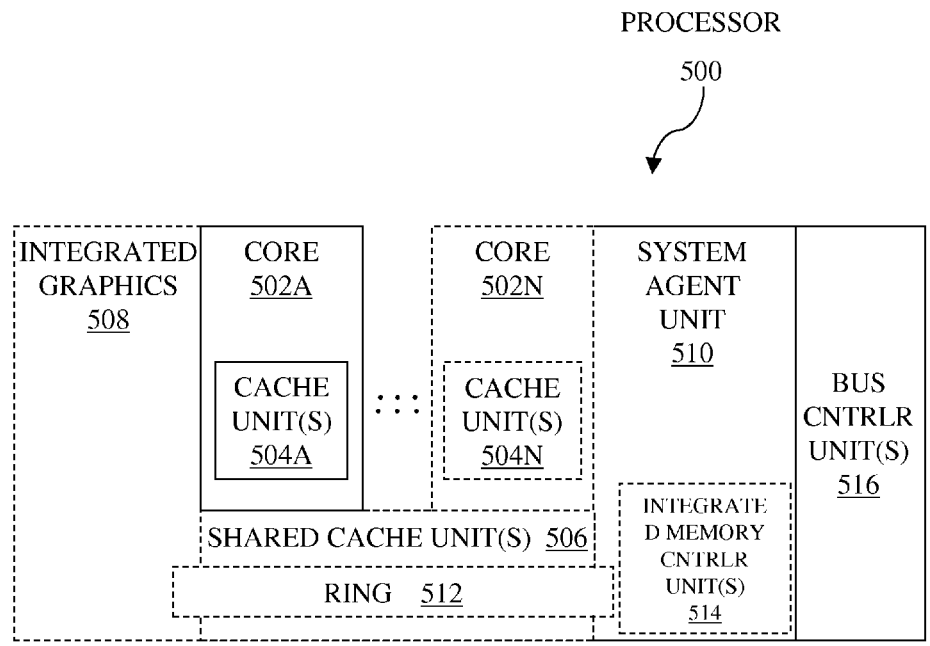
FIG. 5 is a block diagram of one embodiment of a processor to execute instructions that provide SIMD SM3 cryptographic hashing functionality.

FIG. 5 is a block diagram of a single core processor and a multicore processor 500 with integrated memory controller and graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and an integrated graphics logic 508.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multithreading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 6:
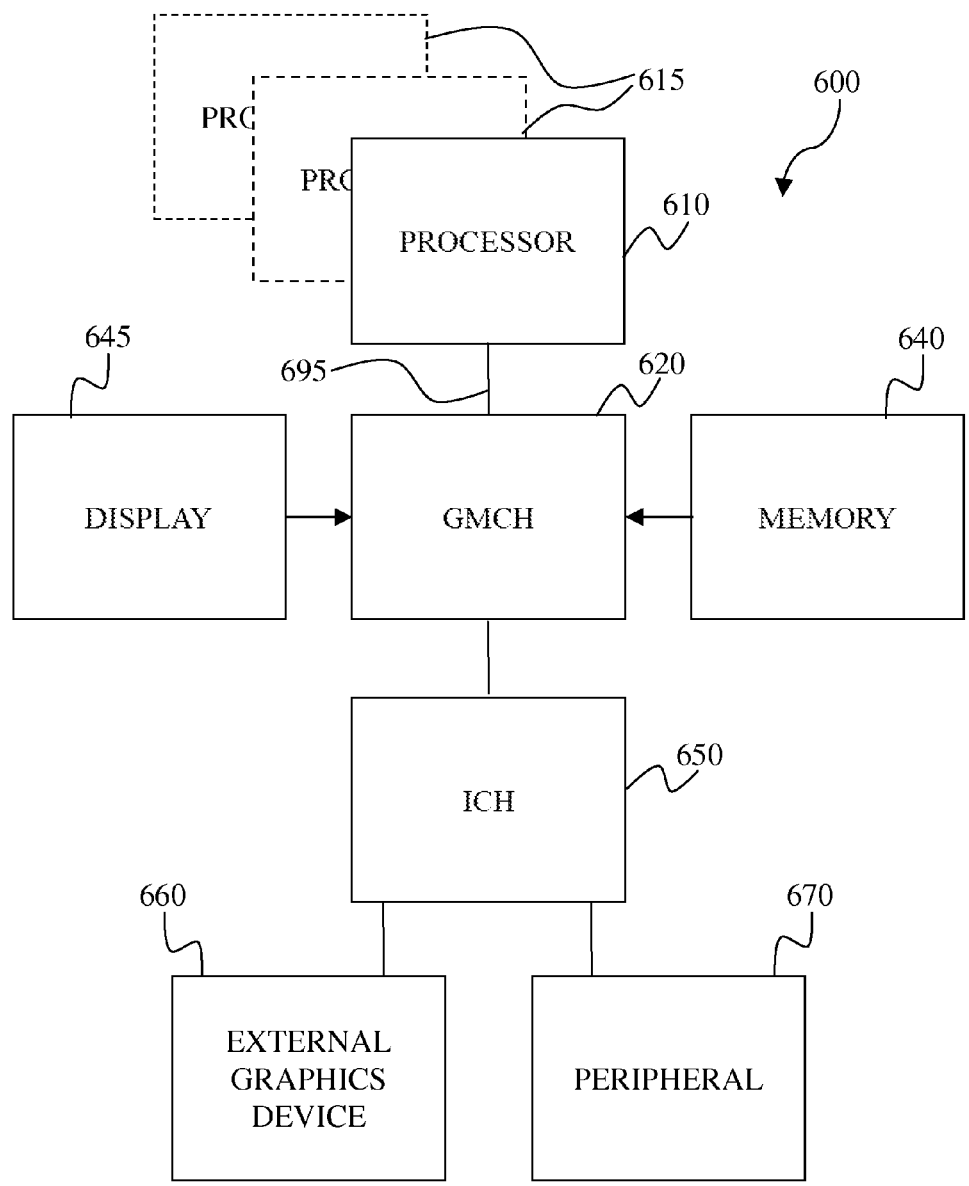
FIG. 6 is a block diagram of one embodiment of a computer system to execute instructions that provide SIMD SM3 cryptographic hashing functionality.
Figure 7:
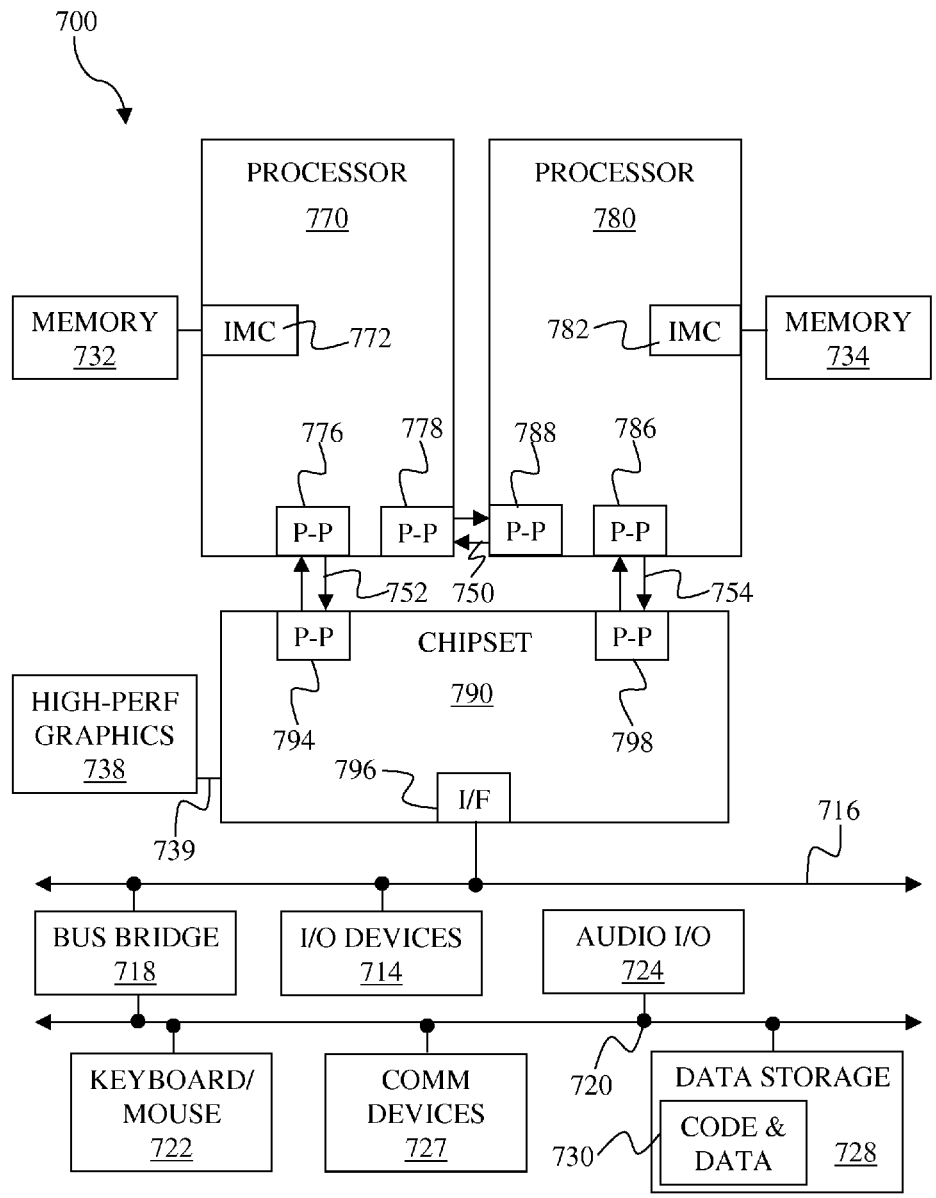
FIG. 7 is a block diagram of another embodiment of a computer system to execute instructions that provide SIMD SM3 cryptographic hashing functionality.
Figure 8:
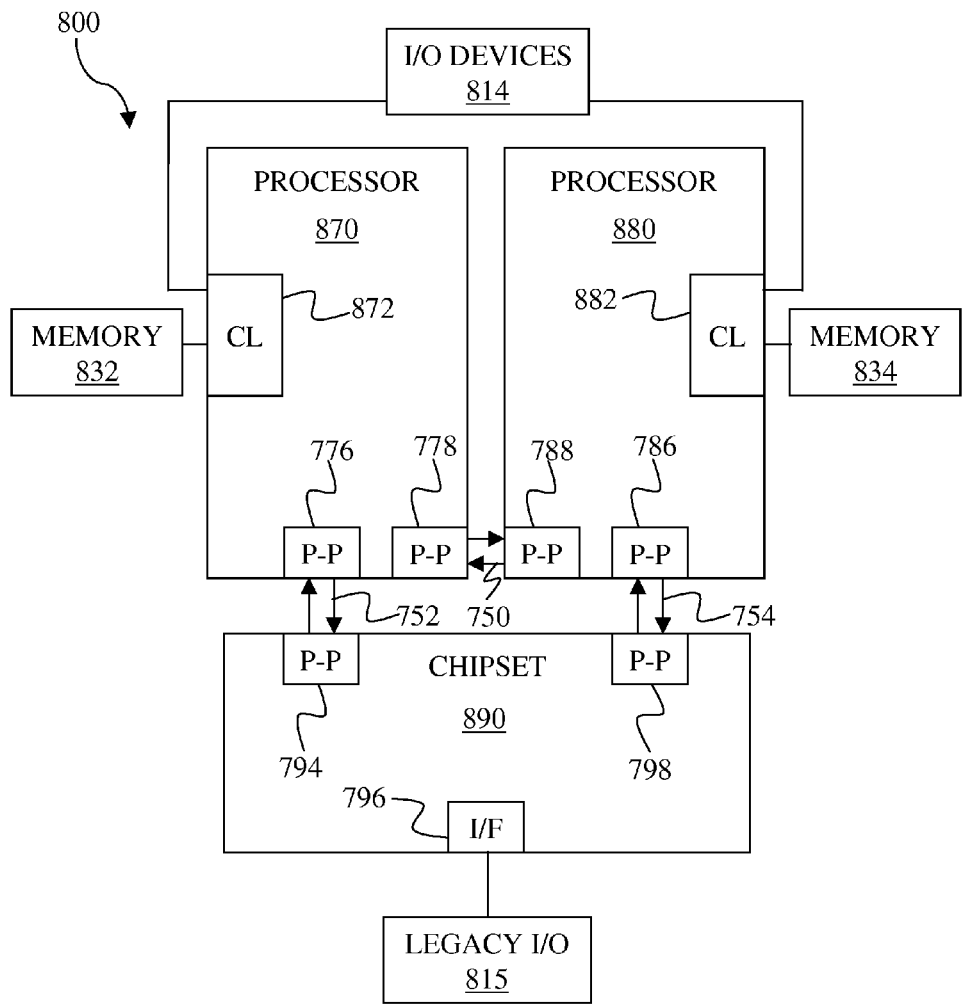
FIG. 8 is a block diagram of another embodiment of a computer system to execute instructions that provide SIMD SM3 cryptographic hashing functionality.
Figure 9:
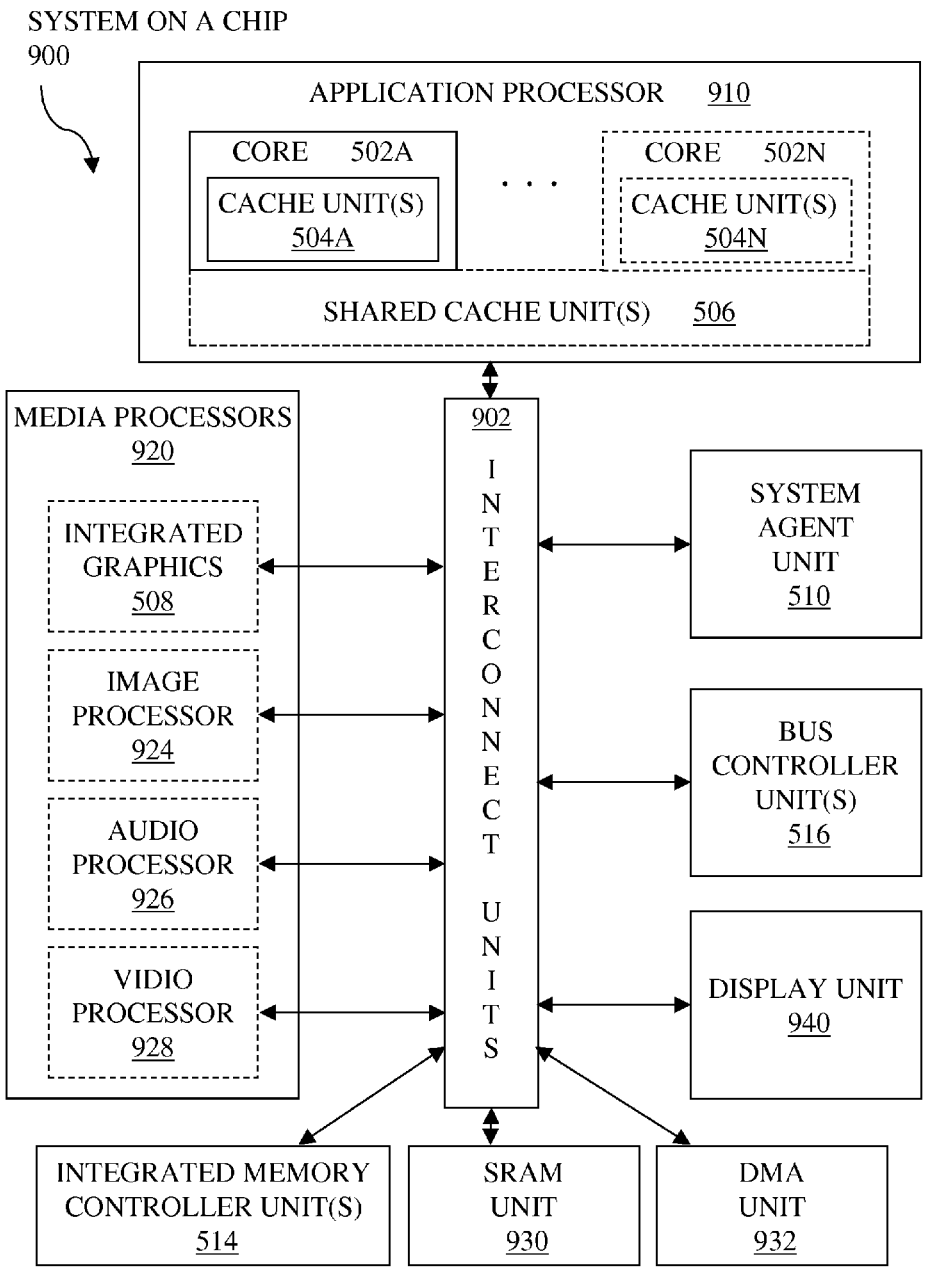
FIG. 9 is a block diagram of one embodiment of a system-on-a-chip to execute instructions that provide SIMD SM3 cryptographic hashing functionality.

FIGS. 6-8 are exemplary systems suitable for including the processor 500, while FIG. 9 is an exemplary system on a chip (SoC) that may include one or more of the cores 502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the processor 500. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, microarchitectural, thermal, power consumption characteristics, and the like. These differences may effectively manifest themselves as asymmetry and heterogeneity amongst the processors 610, 615. For at least one embodiment, the various processors 610, 615 may reside in the same die package.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610,615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Referring now to FIG. 8, shown is a block diagram of a third system 800 in accordance with an embodiment of the present invention Like elements in FIG. 7 and FIG. 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as that described above in connection with FIGS. 5 and 7. In addition. CL 872, 882 may also include I/O control logic. FIG. 8 illustrates that not only are the memories 832, 834 coupled to the CL 872, 882, but also that I/O devices 814 are also coupled to the control logic 872, 882. Legacy I/O devices 815 are coupled to the chipset 890.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N and shared cache unit(s) 506; a system agent unit 510; a bus controller unit(s) 516; an integrated memory controller unit(s) 514; a set of one or more media processors 920 which may include integrated graphics logic 508, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
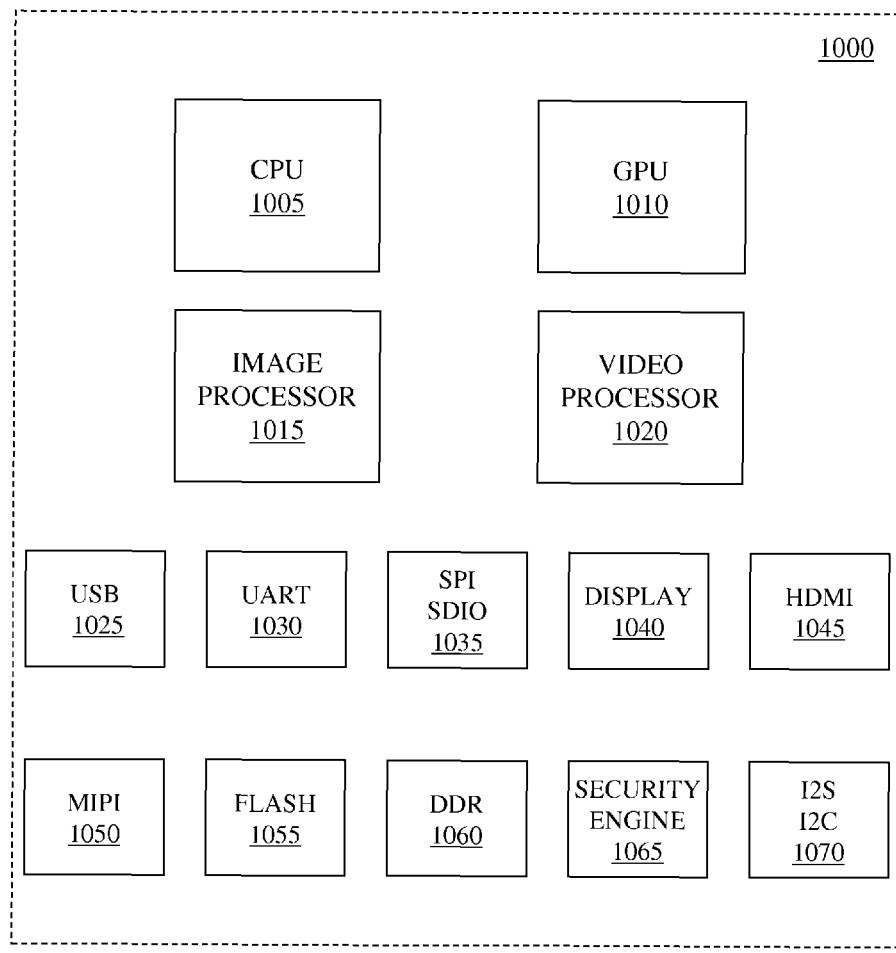
FIG. 10 is a block diagram of an embodiment of a processor to execute instructions that provide SIMD SM3 cryptographic hashing functionality.

FIG. 10 illustrates a processor containing a central processing unit (CPU) and a graphics processing unit (GPU), which may perform at least one instruction according to one embodiment. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, High-Definition Multimedia Interface (HDMI) controller 1045, MIPI controller 1050, flash memory controller 1055, dual data rate (DDR) controller 1060, security engine 1065, and I²S/I²C (Integrated Interchip Sound/Inter-Integrated Circuit) interface 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
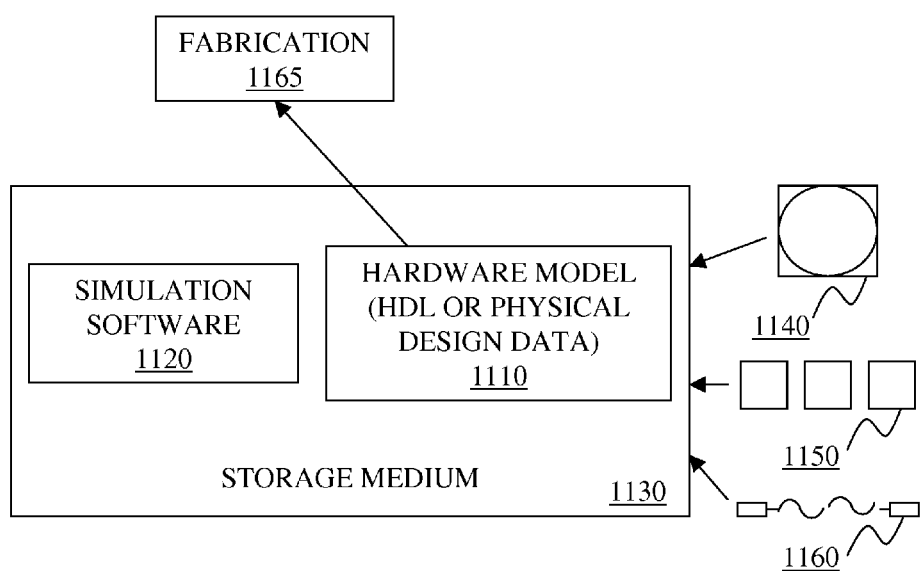
FIG. 11 is a block diagram of one embodiment of an IP core development system that provides SIMD SM3 cryptographic hashing functionality.

FIG. 11 shows a block diagram illustrating the development of IP cores according to one embodiment. Storage 1130 includes simulation software 1120 and/or hardware or software model 1110. In one embodiment, the data representing the IP core design can be provided to the storage 1130 via memory 1140 (e.g., hard disk), wired connection (e.g., internet) 1150 or wireless connection 1160. The IP core information generated by the simulation tool and model can then be transmitted to a fabrication facility where it can be fabricated by a third party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
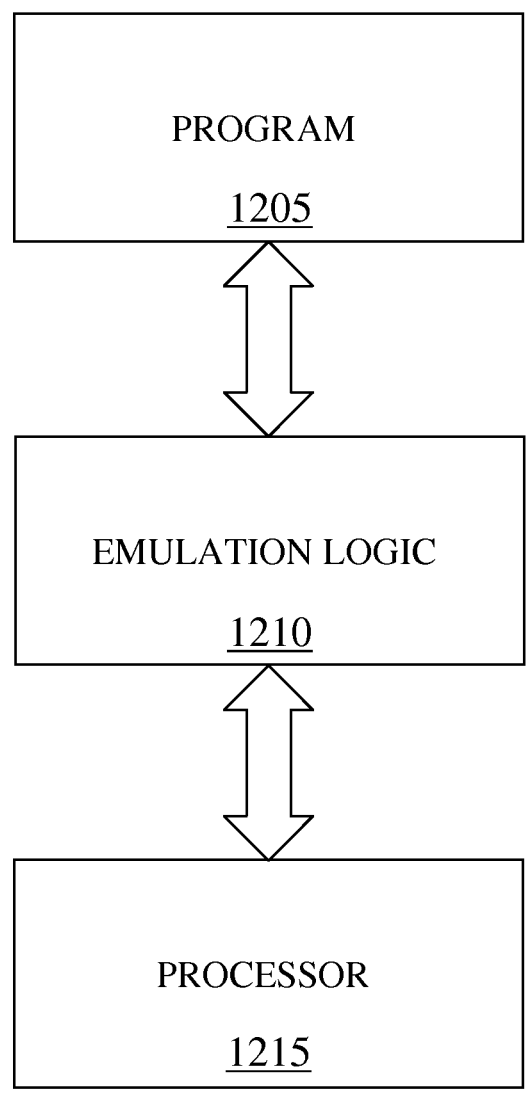
FIG. 12 illustrates one embodiment of an architecture emulation system that provides SIMD SM3 cryptographic hashing functionality.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to be executed natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
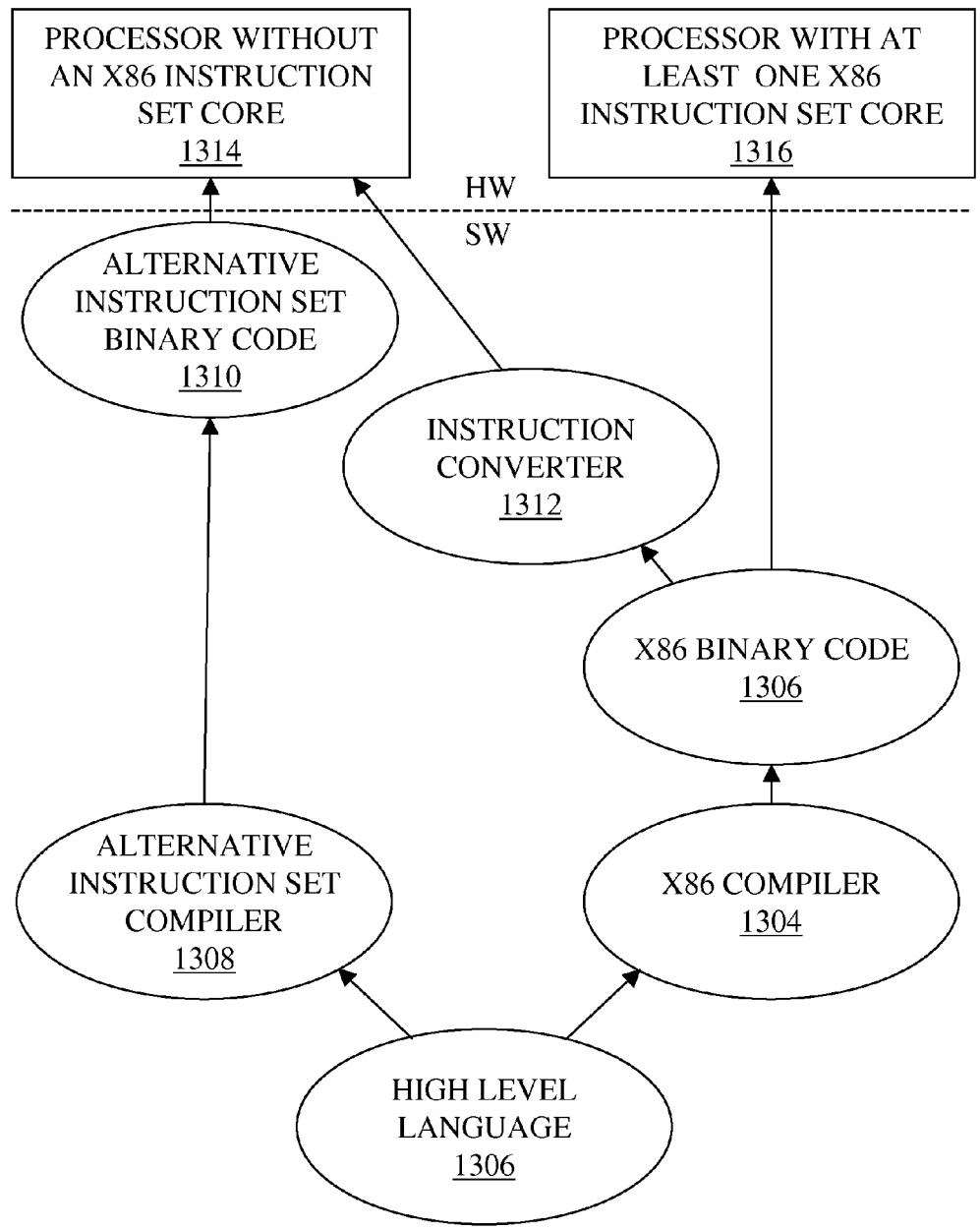
FIG. 13 illustrates one embodiment of a system to translate instructions that provide SIMD SM3 cryptographic hashing functionality.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Figure 14A:
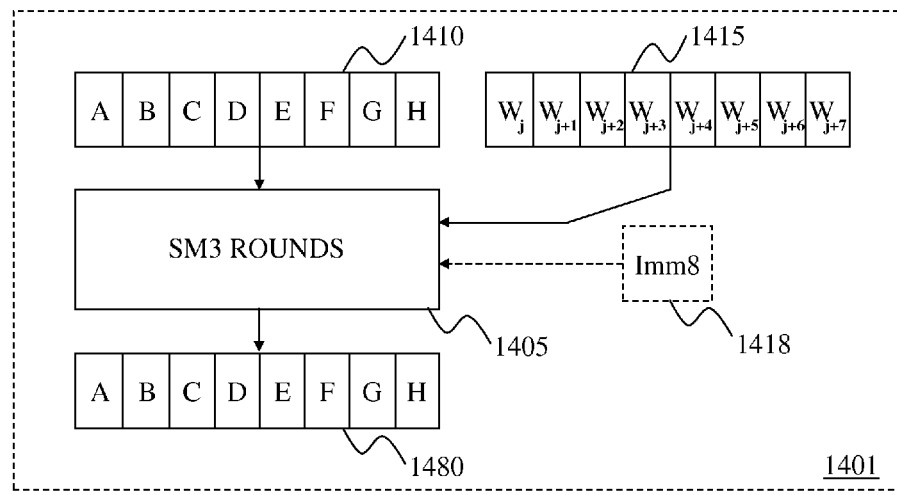
FIG. 14A illustrates a diagram for one embodiment of an apparatus for execution of an instruction to provide SIMD SM3 cryptographic hashing functionality.

FIG. 14A illustrates a diagram for one embodiment of an apparatus 1401 for execution of an instruction to provide SIMD SM3 cryptographic hashing functionality. Embodiments of apparatus 1401 may be part of a pipeline 400 (e.g. execution stage 416) or part of a core 490 (e.g. execution unit(s) 462) for execution of an instruction to provide SIMD SM3 cryptographic hashing functionality. Embodiments of apparatus 1401 may be coupled with a decode stage (e.g.

decode 406) or a decoder (e.g. decode unit 440) to decode an instruction for a SIMD SM3 cryptographic hashing algorithm round slice having a number of iterations less that the total number of round iterations of the hash algorithm (e.g. two or four iterations, which may permit concurrent execution of other instructions in a superscalar execution pipeline) the instruction specifying an intermediate hash value input operand 1410, a source data operand 1415 set, and a round-slice portion of the hashing algorithm (e.g. as an initial round, j, and/or a number of iterations, i, in an optional immediate operand 1418, or in an instruction mnemonic and/or operation code). Embodiments of the instruction may also specify a round constant operand set (e.g. $T_j \ldots T_{j+i-1}$ for an initial round, j, and a number of iterations, i, in an optional immediate operand 1418). One or more execution units (e.g. execution apparatus 1405) responsive to the decoded instruction, perform an SM3 hashing round slice set of round iterations upon the source data operand set 1415, applying the intermediate hash value input operand 1410 and the round constant operand set, and store a result 1480 of the first instruction in a SIMD destination register.

It will be appreciated that providing SIMD SM3 cryptographic hashing instructions, which perform a pre-specified number of iterations of the hashing round, may enable SIMD execution of the hashing algorithm in a processor pipeline concurrently with other SIMD processing and scalar processing, such as preprocessing of message "chunks" and preparing pre-rotated round constants (e.g. $T_j <<< j$) according to the specific hashing algorithm implementation. That is to say that, where a single iteration of a hashing round may have a pipeline latency of three cycles (e.g. 3 cycles per round), by performing a specified number of iterations and/or bypassing results back through the pipeline, two iterations may have a latency of only four cycles (e.g. 2 cycles per round), four iterations may have a latency of only six cycles (e.g. 1.5 cycles per round). During those pipeline latencies of four or six cycles, other useful processing may be performed in parallel or concurrently with the hashing round slice. Thus providing an instruction for a SIMD SM3 cryptographic hashing algorithm round slice, which has a number of iterations (e.g. two, four or eight iterations, etc., per slice) but less that the total number of round iterations of the hash algorithm, permits concurrent execution of other instructions in a superscalar execution pipeline, and/or an out-of-order processor pipeline, thereby significantly improving processing throughput, and leveraging the scaling of frequencies for fabrication process improvements associated with general purpose processors with vector registers.

For example, embodiments of apparatus 1401 may be coupled with vector registers (e.g. physical register files unit(s) 458) comprising a variable plurality of m variable sized data fields to store values of a variable plurality of m variable sized data elements. Embodiments of the instruction to provide SIMD SM3 cryptographic hashing algorithm round slice specify an intermediate hash value input state operand 1410 specifying one of the vector registers, an immediate operand 1418, and a source data operand 1415 set. Embodiments of apparatus 1401 may include an execution unit 1405 coupled with the register file (e.g. physical register files unit(s) 458), and responsive to the decoded instruction to provide SIMD SM3 cryptographic hashing algorithm round slice functionality, to receive the intermediate hash value input state operand 1410 and the message source data operand 1415 set, and to generate an output state 1480 for each iteration of the plurality of iterations. The result 1480 of the decoded instruction may then be stored in a SIMD destination register (e.g. in physical register files unit(s) 458).

Figure 14B:
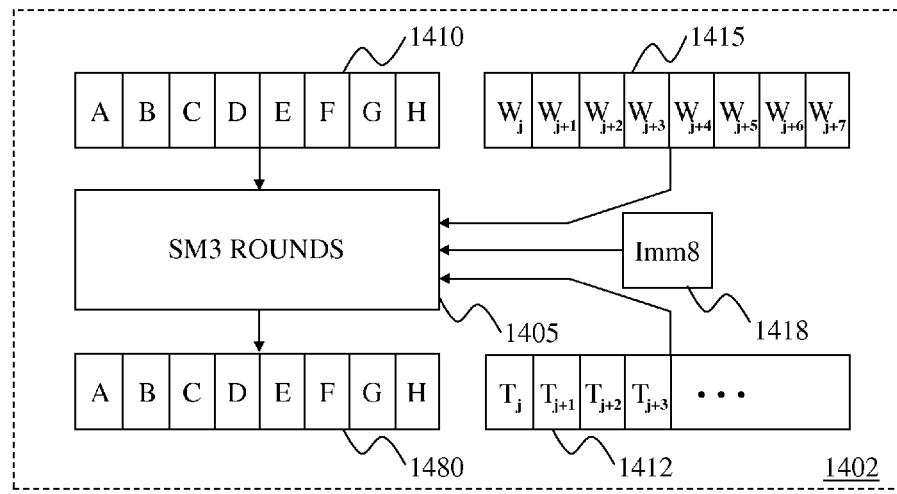
FIG. 14B illustrates a diagram for an alternative embodiment of an apparatus for execution of an instruction to provide SIMD SM3 cryptographic hashing functionality.

FIG. 14B illustrates a diagram for an alternative embodiment of an apparatus 1402 for execution of an instruction to provide SIMD SM3 cryptographic hashing functionality. Embodiments of apparatus 1402 may be part of a pipeline 400 (e.g. execution stage 416) or part of a core 490 (e.g. execution unit(s) 462) for execution of an instruction to provide SIMD SM3 cryptographic hashing functionality. Embodiments of apparatus 1402 may be coupled with a decode stage (e.g. decode 406) or a decoder (e.g. decode unit 440) to decode an instruction for a SIMD SM3 cryptographic hashing algorithm round slice having a number of iterations less that the total number of round iterations of the hash algorithm (e.g. two or four iterations, which may permit concurrent execution of other instructions in a superscalar execution pipeline) the instruction specifying an intermediate hash value input operand 1410, a source data operand 1415 set, a round constant operand 1412 set (e.g. a single pre-rotated $T_j$ for the initial round, or optionally a set of four pre-rotated $T_j \ldots T_{j+3}$), and a round-slice portion of the hashing algorithm (e.g. as an initial round, j, and/or a number of iterations, i, in an immediate operand 1418). One or more execution units (e.g. execution apparatus 1405) responsive to the decoded instruction, perform an SM3 hashing round slice set of round iterations upon the source data operand 1415 set, applying the intermediate hash value input operand 1410 and the round constant operand 1412 set, and store a result 1480 of the first instruction in a SIMD destination register (e.g. in some embodiments the same SIMD register used for intermediate hash value input operand 1410).

Figure 15:
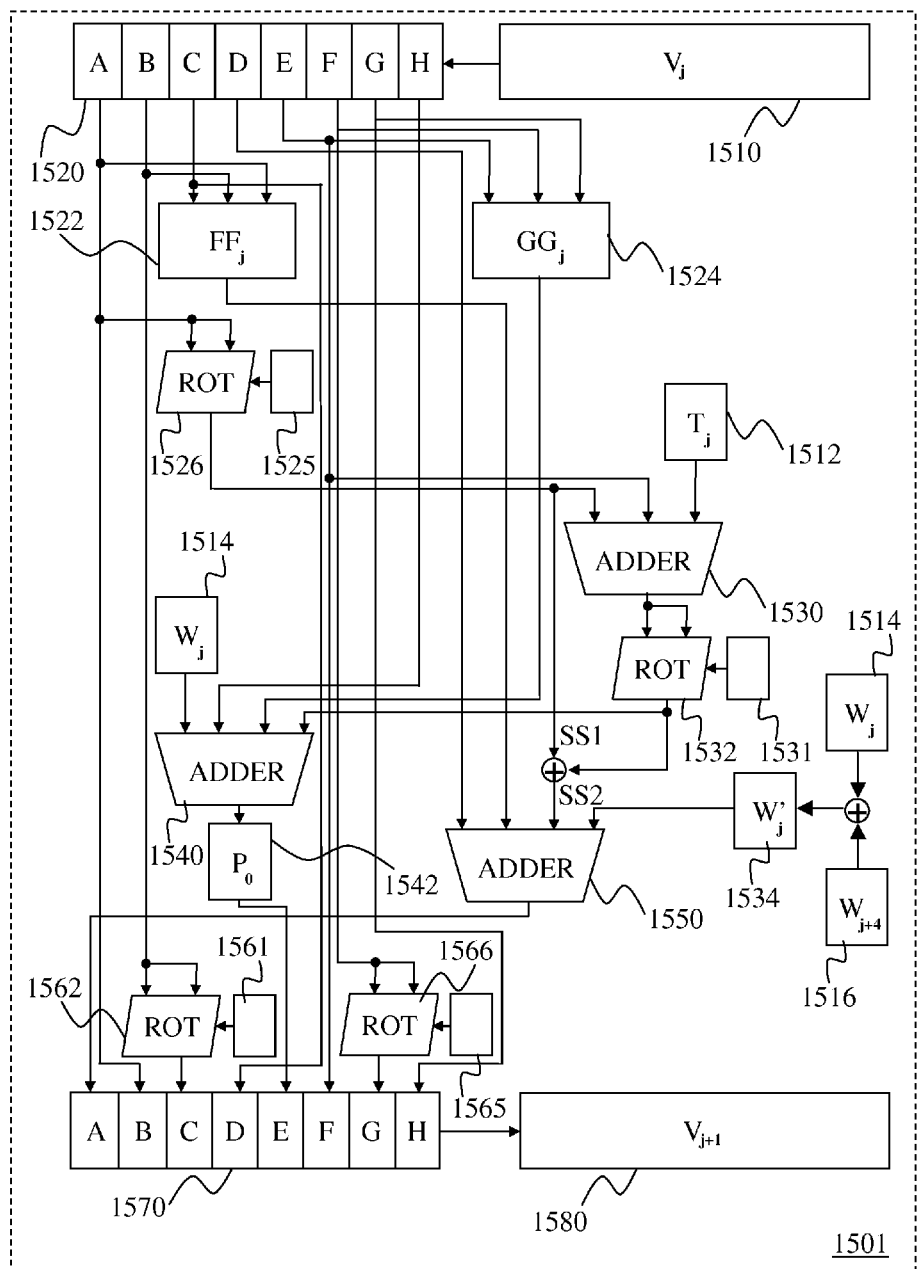
FIG. 15 illustrates a diagram for another alternative embodiment of an apparatus for execution of an instruction to provide SIMD SM3 cryptographic hashing functionality.

FIG. 15 illustrates a diagram for another alternative embodiment of an apparatus 1501 for execution of an instruction to provide SIMD SM3 cryptographic hashing functionality. Embodiments of apparatus 1501 may be coupled with a decode stage (e.g. decode 406) or a decoder (e.g. decode unit 440) to decode an instruction for a SIMD SM3 cryptographic hashing algorithm round slice having a number of iterations (e.g. two or four iterations, although just one iteration is illustrated) which may permit concurrent execution of other instructions in a superscalar execution pipeline, the instruction specifying an intermediate hash value input operand 1510, a source data operand set (e.g. including message words $W_j$ and $W_{j+4}$), a round constant operand set (e.g. including a pre-rotated TA and a round-slice portion of the hashing algorithm (e.g. including an indicator of an initial round, j, and/or a number of iterations, i, optionally in an immediate operand). One or more execution units (e.g. including execution apparatus 1501) responsive to the decoded instruction, perform an SM3 hashing round slice set of round iterations upon the source data operand set (e.g. including 1514 and 1516), applying the intermediate hash value input operand 1510 and one or more of the round constant 1512 operand set, and store a result 1580 of the decoded instruction in a SIMD destination register (e.g. in some embodiments the same SIMD register used for intermediate hash value input operand 1510).

As illustrated in execution apparatus 1501, Boolean functions $FF_j$ 1522 and $GG_j$ 1524 may be selected according to the specified round-slice portion of the hashing algorithm (e.g. including an indicator of an initial round, j) for processing the intermediate hash value 32-bit data field inputs A, B, C and E, F, G respectively. According to one embodiment the Boolean functions $FF_j$ and $GG_j$ may be selected as $A \oplus B \oplus C$ and $E \oplus F \oplus G$ respectively, when j is less than 16, or as $(A \wedge B) \vee (A \wedge C) \vee (B \wedge C)$ and $(E \wedge F) \vee (\neg E \wedge G)$ respectively, when j is greater than 15. In each iteration of the SM3 hash-round-slice, a respective round constant 1512, $T_j$, of the round constant operand set is added (e.g. via adder 1530) with a left-rotated respective data field, A, (e.g. via rotator 1526 by a rotation amount 1525) of the intermediate hash value vector 1520 and a second unrotated data field, E, of the intermediate hash value vector 1520. In each iteration of the SM3 hash-round-slice, a respective data field 1514, $W_j$, of the source data operand set is added (e.g. via adder 1540) with the output of Boolean function $GG_j$ 1524, a respective data field, H, of the intermediate hash value vector 1520, and a left-rotated output, SS1, (e.g. via rotator 1532 by a rotation amount 1531) of adder 1530. In each iteration of the SM3 hash-round-slice, the respective data fields 1514, $W_j$, and 1516, $W_{j+4}$, of the source data operand set are XORed to produce the respective data field 1534, $W'_j$, and the left-rotated respective data field, A, is XORed with the left-rotated output, SS1, of adder 1530 to produce the respective data field, SS2. Both respective data fields 1534, $W'_j$, and SS2 are added (e.g. via adder 1550) with the output of Boolean function $FF_j$ 1522 and with a respective data field, D, of the intermediate hash value vector 1520 to produce the new respective data field, A, in preliminary output state 1570. The unrotated respective data field, A, of the intermediate hash value vector 1520 becomes the new respective data field, B, of preliminary output state 1570. The left rotated respective data field, B, (e.g. via rotator 1562 by a rotation amount 1561) of the intermediate hash value vector 1520 becomes the new respective data field, C, of preliminary output state 1570. The unrotated respective data field, C, of the intermediate hash value vector 1520 becomes the new respective data field, D, of preliminary output state 1570. The output of adder 1540 is permuted via permutation 1542, $P_0$, to produce the new respective data field, E, of preliminary output state 1570. The unrotated respective data field, E, of the intermediate hash value vector 1520 becomes the new respective data field, F, of preliminary output state 1570. The left rotated respective data field, F, (e.g. via rotator 1566 by a rotation amount 1565) of the intermediate hash value vector 1520 becomes the new respective data field, G, of preliminary output state 1570. The unrotated respective data field, G, of the intermediate hash value vector 1520 becomes the new respective data field, H, of preliminary output state 1570.

Finally, in each iteration of the SM3 hash-round-slice, the preliminary output state 1570 is stored as a new output state 1580, $V_{j+1}$. In some embodiments an output state latch stores an output state 1580 (e.g. the new $V_{j+1}$ values) generated as a result of an iteration. Bypassing the hash value output state 1580 to the intermediate hash value input state may be performed in some embodiments by a bypass (e.g. bypass network 208 or 210) from the output state 1580 latch to bypass the output state 1580 to the input state 1520 for each next iteration of the plurality of iterations of the SM3 hash-round-slice. Further details of the Boolean functions, permutations, round constant parameters, and message expansion, etc. may be found in "SM3 Hash Function," IETF Internet-Draft, Chinese Academy of Science, 14 Feb. 2014, version 01, available on the world-wide-web at tools.ietf.org/pdf/draft-shen-sm3-hash-01.pdf.

Figure 16:
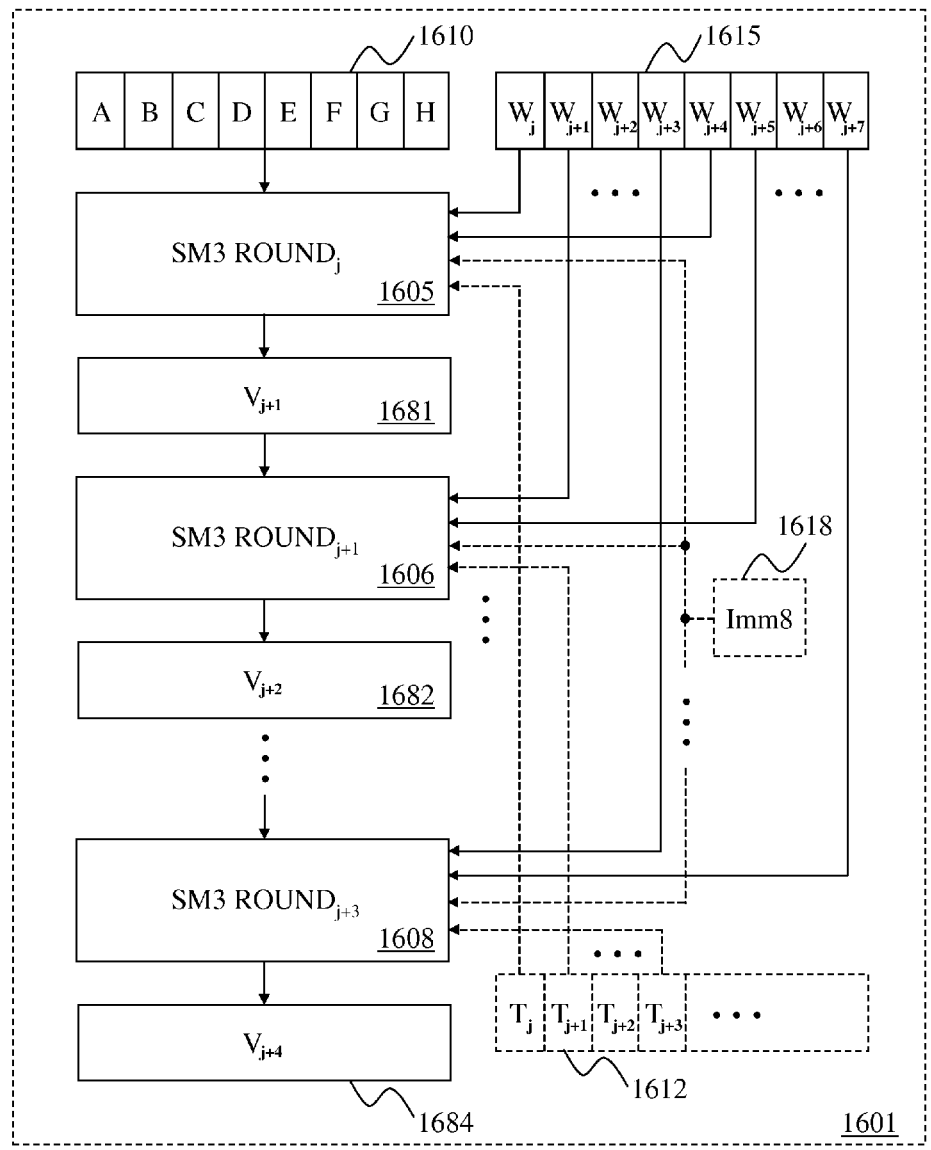
FIG. 16 illustrates a diagram for another alternative embodiment of an apparatus for execution of an instruction to provide SIMD SM3 cryptographic hashing functionality.

FIG. 16 illustrates a diagram for another alternative embodiment of an apparatus 1601 for execution of an instruction to provide SIMD SM3 cryptographic hashing functionality. Embodiments of apparatus 1601 may be part of a pipeline 400 (e.g. execution stage 416) or part of a core 490 (e.g. execution unit(s) 462) for execution of an instruction to provide SIMD SM3 cryptographic hashing functionality. Embodiments of apparatus 1601 may be coupled with a decode stage (e.g. decode 406) or a decoder (e.g. decode unit 440) to decode an instruction for a SIMD SM3 cryptographic hashing algorithm round slice having a number of iterations less that the total number of round iterations of the hash algorithm (e.g. four iterations, which may permit concurrent execution of other instructions in a superscalar execution pipeline) the instruction specifying an intermediate hash value input operand 1610, a source data operand 1615 set, an optional round constant operand 1612 set (e.g. including either a single initial pre-rotated $T_j$ or optionally a set of four pre-rotated $T_j \ldots T_{j+3}$), and a round-slice portion of the hashing algorithm (e.g. optionally as an initial round, j, and/or a number of iterations, i, in an immediate operand 1418). Some embodiments of the instruction for a SIMD SM3 cryptographic hashing algorithm round slice may specify a single initial pre-rotated constant $T_j$ and internally rotate that single initial constant one bit in each round of the slice. Other alternative embodiments of the instruction for a SIMD SM3 cryptographic hashing algorithm round slice may specify only a value for j (e.g. in an immediate operand 1618) and look up or generate each rotated constant, $T_j <<< j$, internally. Still other alternative embodiments of the instruction for a SIMD SM3 cryptographic hashing algorithm round slice may specify a plurality of pre-rotated constants as a set (e.g. of four pre-rotated $T_j \ldots T_{j+3}$). One or more execution units (e.g. execution apparatus 1601) responsive to the decoded instruction, perform an SM3 hashing round slice set of round iterations upon the source data operand 1615 set (e.g. the respective data fields $W_j$, and $W_{j+4}$) applying the intermediate hash value input operand 1610 and one or more of the round constant operand 1612 set (e.g. $T_j$) in SM3 round$_j$ 1605 to produce preliminary output state 1681, $V_{j+1}$. Further responsive to the decoded instruction, a second SM3 hashing round iteration is performed upon the source data operand 1615 set (e.g. the respective data fields $W_{j+1}$, and $W_{j+5}$) applying the second intermediate hash value input 1681, $V_{j+1}$ and one or more of the round constant operand 1612 set (e.g. $T_{j+1}$) in SM3 round$_{j+1}$ 1606 to produce preliminary output state 1682, $V_{j+2}$; ... and a fourth SM3 hashing round iteration is performed upon the source data operand 1615 set (e.g. the respective data fields $W_{j+3}$, and $W_{j+7}$) applying the fourth intermediate hash value input, $V_{j+3}$, (not shown) and one or more of the round constant operand 1612 set (e.g. $T_{j+3}$) in SM3 round$_{j+3}$ 1608 to produce as a result of the instruction a new output state 1684, $V_{j+4}$, and store the result 1684 of the instruction in a SIMD destination register (e.g. in some embodiments the same SIMD register used for intermediate hash value input operand 1610).

Some embodiments may also include a processor comprising a decoder to decode instructions for a SIMD SM3 message expansion, specifying first and second source data operand sets, and an expansion extent. Processor execution units, responsive to the instruction, perform a number of SM3 message expansions, from the first and second source data operand sets, determined by the specified expansion extent and store the result into a SIMD destination register. For some embodiments of SIMD instructions and processing logic to provide SM3 cryptographic hashing functionality, both SM3 message expansion and SM3 cryptographic hash rounds may be performed in slices of iterations concurrently and/or in parallel in a standard execution pipeline of a modern microprocessor. It will be appreciated that the number of iterations per slice may be conveniently chosen so as to provide a sufficient cover for other concurrent in-flight instructions by the latencies associated with performing a slice of SM3 message expansions and/or a slice of SM3 cryptographic hash rounds.

Figure 17A:
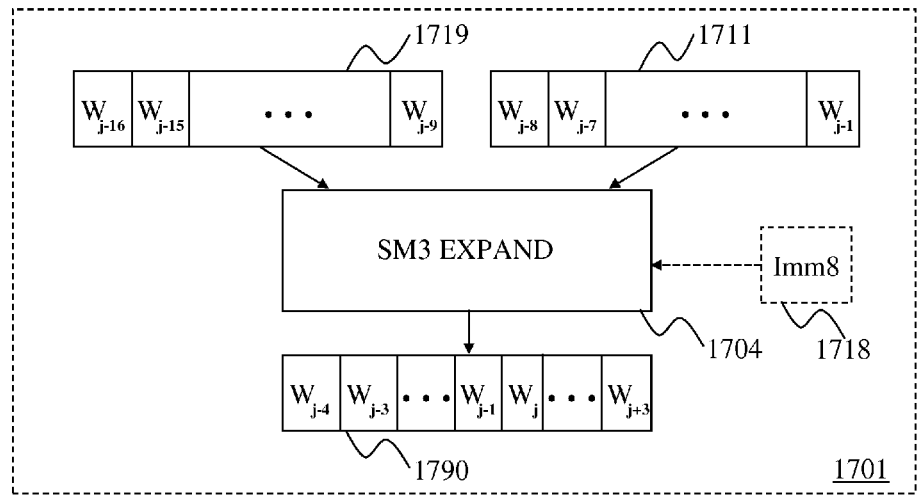
FIG. 17A illustrates a diagram for one embodiment of an apparatus for execution of another instruction to provide SIMD SM3 cryptographic hashing functionality.

FIG. 17A illustrates a diagram for one embodiment of an apparatus 1701 for execution of another instruction to provide SIMD SM3 cryptographic hashing functionality. Embodiments of apparatus 1701 may be part of a pipeline 400 (e.g. execution stage 416) or part of a core 490 (e.g. execution unit(s) 462) for execution of an instruction to provide SIMD SM3 cryptographic hashing functionality. Embodiments of apparatus 1701 may be coupled with a decode stage (e.g. decode 406) or a decoder (e.g. decode unit 440) to decode an instruction for a SIMD SM3 cryptographic hashing algorithm message expansions having a number of iterations less that the total number of message expansion iterations (e.g. less than fifty-two message expansion iterations) of the hash algorithm (e.g. two or four iterations, which may permit concurrent execution of other instructions in a superscalar execution pipeline) the instruction specifying a first source data operand 1719 set (e.g. $W_{j-16}, W_{j-15}, \ldots W_{j-9}$) and a second source data operand 1711 set (e.g. $W_{j-8}, W_{j-7}, \ldots W_{j-1}$), and an expansion extent (e.g. optionally as an expansion extent number of iterations, e, in an immediate operand 1718, or in an instruction mnemonic and/or operation code). One or more execution units (e.g. execution apparatus 1704) responsive to the decoded instruction, perform an SM3 hashing algorithm slice set of message expansion iterations upon the first source data operand 1719 set and the second source data operand 1711 set, the number of SM3 message expansions being determined by the specified expansion extent, and store a result 1790 (e.g. $W_{j-4}, \ldots W_{j-1}, W_j, \ldots W_{j+3}$) of the instruction in a SIMD destination register.

Figure 17B:
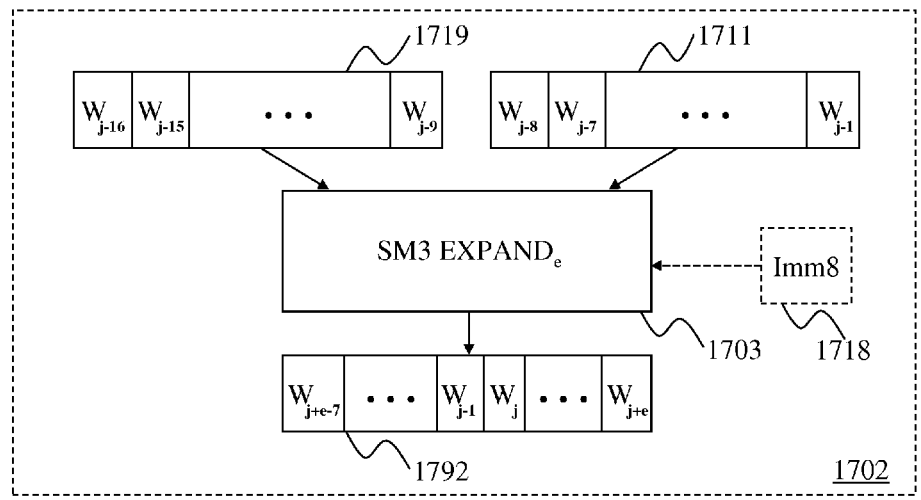
FIG. 17B illustrates a diagram for an alternative embodiment of an apparatus for execution of another instruction to provide SIMD SM3 cryptographic hashing functionality.

FIG. 17B illustrates a diagram for an alternative embodiment of an apparatus 1702 for execution of another instruction to provide SIMD SM3 cryptographic hashing functionality. Embodiments of apparatus 1702 may be part of a pipeline 400 (e.g. execution stage 416) or part of a core 490 (e.g. execution unit(s) 462) for execution of an instruction to provide SIMD SM3 cryptographic hashing functionality. Embodiments of apparatus 1702 may be coupled with a decode stage (e.g. decode 406) or a decoder (e.g. decode unit 440) to decode an instruction for a SIMD SM3 cryptographic hashing algorithm message expansions having a number of iterations less that the total number of message expansion iterations (e.g. less than fifty-two message expansion iterations) of the hash algorithm (e.g. two or four iterations, which may permit concurrent execution of other instructions in a superscalar execution pipeline) the instruction specifying a first source data operand 1719 set (e.g. $W_{j-16}, W_{j-15}, \ldots W_{j-9}$) and a second source data operand 1711 set (e.g. $W_{j-8}, W_{j-7}, \ldots W_{j-1}$), and an expansion extent (e.g. optionally as an expansion extent number of iterations, e+1, in an immediate operand 1718, or in an instruction mnemonic and/or operation code). One or more execution units (e.g. execution apparatus 1703) responsive to the decoded instruction, perform an SM3 hashing algorithm slice set of message expansion iterations upon the first source data operand 1719 set and the second source data operand 1711 set, the number of SM3 message expansions being determined by the specified expansion extent, and store a result 1792 (e.g. $W_{j+e-7}, \ldots W_{j-1}, W_j, \ldots W_{j+e}$) of the instruction in a SIMD destination register (e.g. in some embodiments the same SIMD register used for the first source data operand 1719 or for the second source data operand 1711).

Figure 18A:
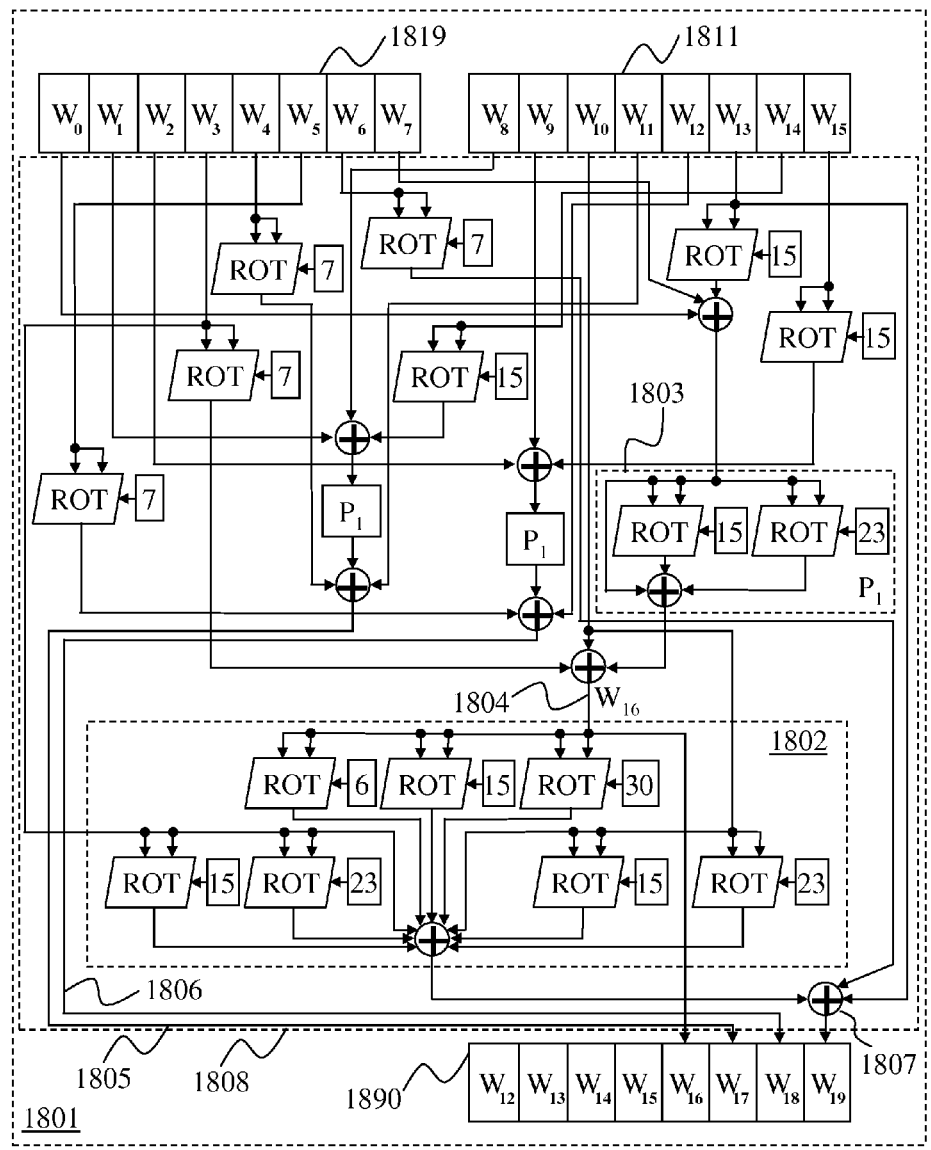
FIG. 18A illustrates a diagram for another alternative embodiment of an apparatus for execution of another instruction to provide SIMD SM3 cryptographic hashing functionality.

FIG. 18A illustrates a diagram for another alternative embodiment of an apparatus 1801 for execution of another instruction to provide SIMD SM3 cryptographic hashing functionality. Embodiments of apparatus 1801 may be part of a pipeline 400 (e.g. execution stage 416) or part of a core 490 (e.g. execution unit(s) 462) for execution of an instruction to provide SIMD SM3 cryptographic hashing functionality. Embodiments of apparatus 1801 may be coupled with a decode stage (e.g. decode 406) or a decoder (e.g. decode unit 440) to decode an instruction for a SIMD SM3 cryptographic hashing algorithm message expansions having a number of iterations less that the total number of message expansion iterations (e.g. less than fifty-two message expansion iterations) of the hash algorithm (e.g. two or four iterations, which may permit concurrent execution of other instructions in a superscalar execution pipeline) the instruction specifying a first source data operand 1819 set (e.g. $W_0, W_1, \ldots W_7$) and a second source data operand 1811 set (e.g. $W_8, W_9, \ldots W_{15}$), and an expansion extent (e.g. optionally as an expansion extent number of iterations, or iterations minus one, e, in an immediate operand not shown, or in an instruction mnemonic and/or operation code). One or more execution units (e.g. execution apparatus 1808) responsive to the decoded instruction, perform an SM3 hashing algorithm slice set of message expansion iterations upon the first source data operand 1819 set and the second source data operand 1811 set, the number of SM3 message expansions being determined by the specified expansion extent. For example, in one embodiment a newly expanded (or extended) message word, $W_{16}$, is produced as an element of a result 1890 of the instruction as follows: $W_{16}=P_1(W_0 \oplus W_7 \oplus (W_{13}<<<15)) \oplus (W_3<<<7) \oplus W_{10}$, at 1804 wherein permutation 1803, $P_1$, is defined as $P_1(X)=X \oplus (X<<<15) \oplus (X<<<23)$. A newly expanded (or extended) message word, $W_{17}$, is produced as an element of result 1890 of the instruction as follows: $W_{17}=P_1(W_1 \oplus W_8 \oplus (W_{14}<<<15)) \oplus (W_4<<<7) \oplus W_{11}$, at 1805. A newly expanded (or extended) message word, $W_{18}$, is produced as an element of result 1890 of the instruction as: $W_{18}=P_1(W_2 \oplus W_9 \oplus (W_{15}<<<15)) \oplus (W_5<<<7) \oplus W_{12}$, at 1806. A message expansion for one of the four new 32-bit words, $W_{19}$, requires one other of the four new 32-bit words (i.e. $W_{16}$) in addition to 32-bit word data elements of the first (i.e. 1819) and second (i.e. 1811) source data operand sets. Accordingly, the permutation $P_1(W_3 \oplus W_{10} \oplus (W_{16}<<<15))$, in one embodiment, may be produced as shown in processing block 1802 as $P_1(W_3) \oplus P_1(W_{10}) \oplus P_1(W_{16}<<<15)$ and XORed with ($W_6<<<7$) and with $W_{13}$ to produce, at 1807, a newly expanded (or extended) message word, $W_{19}$, as an element of result 1890 of the instruction. The result 1890 (e.g. $W_{12}, \ldots W_{15}, W_{16}, \ldots W_{19}$) of the instruction may then be stored in a SIMD destination register. In some embodiments an output latch stores the result 1890 generated as an intermediate result of an iteration. Bypassing the intermediate result 1890 to one or more input source data operand of another micro-instruction (or micro-operation, or uop) may be performed in some embodiments by a bypass (e.g. bypass network 208 or 210).

Figure 18B:
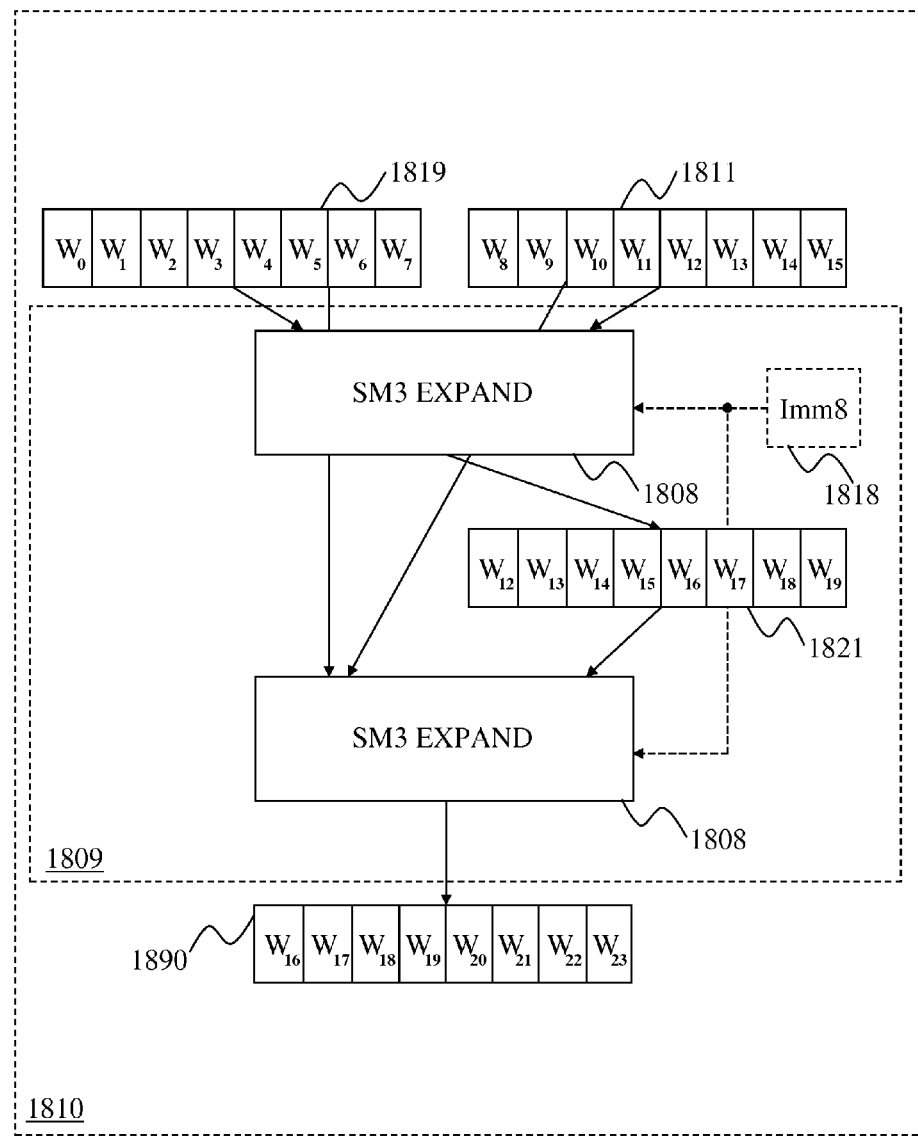
FIG. 18B illustrates a diagram for yet another alternative embodiment of an apparatus for execution of another instruction to provide SIMD SM3 cryptographic hashing functionality.

FIG. 18B illustrates a diagram for yet another alternative embodiment of an apparatus 1810 for execution of another instruction to provide SIMD SM3 cryptographic hashing functionality. Embodiments of apparatus 1810 may be part of a pipeline 400 (e.g. execution stage 416) or part of a core 490 (e.g. execution unit(s) 462) for execution of an instruction to provide SIMD SM3 cryptographic hashing functionality. Embodiments of apparatus 1810 may be coupled with a decode stage (e.g. decode 406) or a decoder (e.g. decode unit 440) to decode an instruction for a SIMD SM3 cryptographic hashing algorithm message expansions having a number of iterations less that the total number of message expansion iterations (e.g. less than fifty-two message expansion iterations) of the hash algorithm (e.g. eight iterations, which may permit concurrent execution of other instructions in a superscalar execution pipeline) the instruction specifying a first source data operand 1819 set (e.g. $W_0, W_1, \ldots W_7$) and a second source data operand 1811 set (e.g. $W_8, W_9, \ldots W_{15}$), and an expansion extent (e.g. optionally as an expansion extent number of iterations, or iterations minus one, e, in an immediate operand 1818, or in an instruction mnemonic and/or operation code). One or more execution units (e.g. execution apparatus 1809) responsive to the decoded instruction, perform an SM3 hashing algorithm slice set of message expansion iterations upon the first source data operand 1819 set and the second source data operand 1811 set, the number of SM3 message expansions being determined by the specified expansion extent. In one embodiment an intermediate result 1821 (e.g. $W_{12}, \ldots W_{15}, W_{16}, \ldots W_{19}$) may be produced by one or more execution units (e.g. execution apparatus 1808) responsive to the decoded instruction (e.g. as a result of a micro-instruction, micro-operation or uop). The intermediate result 1821 may then be provided to a subsequent logic layer (e.g. execution apparatus 1808) along with elements of the first source data operand 1819 set (e.g. $W_4, W_5, \ldots W_7$) and the second source data operand 1811 set (e.g. $W_8, W_9, \ldots W_{11}$) to produce an expanded (or extended) message result 1890 (e.g. $W_{16}, \ldots W_{19}, W_{20}, \ldots W_{23}$) responsive to the decoded instruction (e.g. as a result of a second micro-instruction, micro-operation or uop). The result 1890 (e.g. $W_{16}, \ldots W_{19}, W_{20}, \ldots W_{23}$) of the instruction may then be stored in a SIMD destination register (e.g. in some embodiments the same SIMD register used for the first source data operand 1719).

Figure 19:
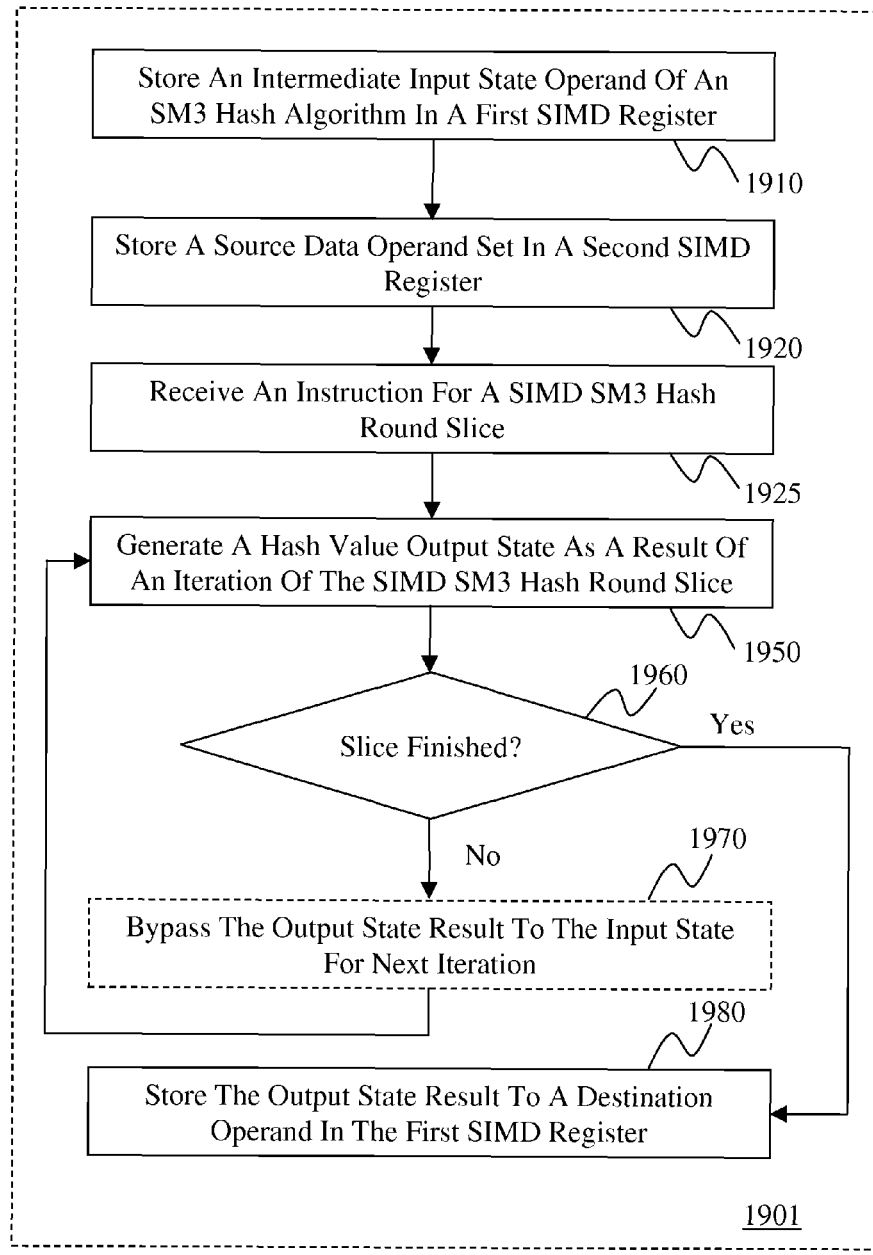
FIG. 19 illustrates a flow diagram for an embodiment of a process for execution of an instruction to provide SIMD SM3 cryptographic hashing functionality.

FIG. 19 illustrates a flow diagram for an embodiment of a process 1901 for execution of an instruction to provide SIMD SM3 cryptographic hashing functionality. Process 1901 and other processes herein disclosed are performed by processing blocks that may comprise dedicated hardware or software or firmware operation codes executable by general purpose machines or by special purpose machines or by a combination of both.

In processing block 1910 of process 1901 an intermediate hash value input state source operand of an SM3 hash algorithm is stored (e.g. in a first portion of a plurality of m data fields) in a first SIMD vector register. In processing block 1920 a source data operand set is stored (e.g. in a second portion of the plurality of m data fields) in a second SIMD vector register. In processing block 1925 an instruction is received for a SIMD SM3 hash round slice portion of an SM3 hashing algorithm. In processing block 1950 a hash value output state is generated as the result of an iteration of the SIMD SM3 hash round slice. In processing block 1960 a determination is made as to whether or not all iterations of the hash round slice have finished. If not, the output state result is optionally bypassed in processing block 1970 to the input state for a next iteration of the hash round slice and processing reiterates beginning in processing block 1950. Otherwise processing proceeds to processing block 1980 where the hash value output state result is stored to a destination operand in the first SIMD register.

It will be appreciated that while the processing blocks of process 1901 and other processes herein disclosed are illustrated as being executed in an iterative fashion, execution in alternative orders, or concurrently, or in parallel may preferably be performed whenever possible.

Figure 20:
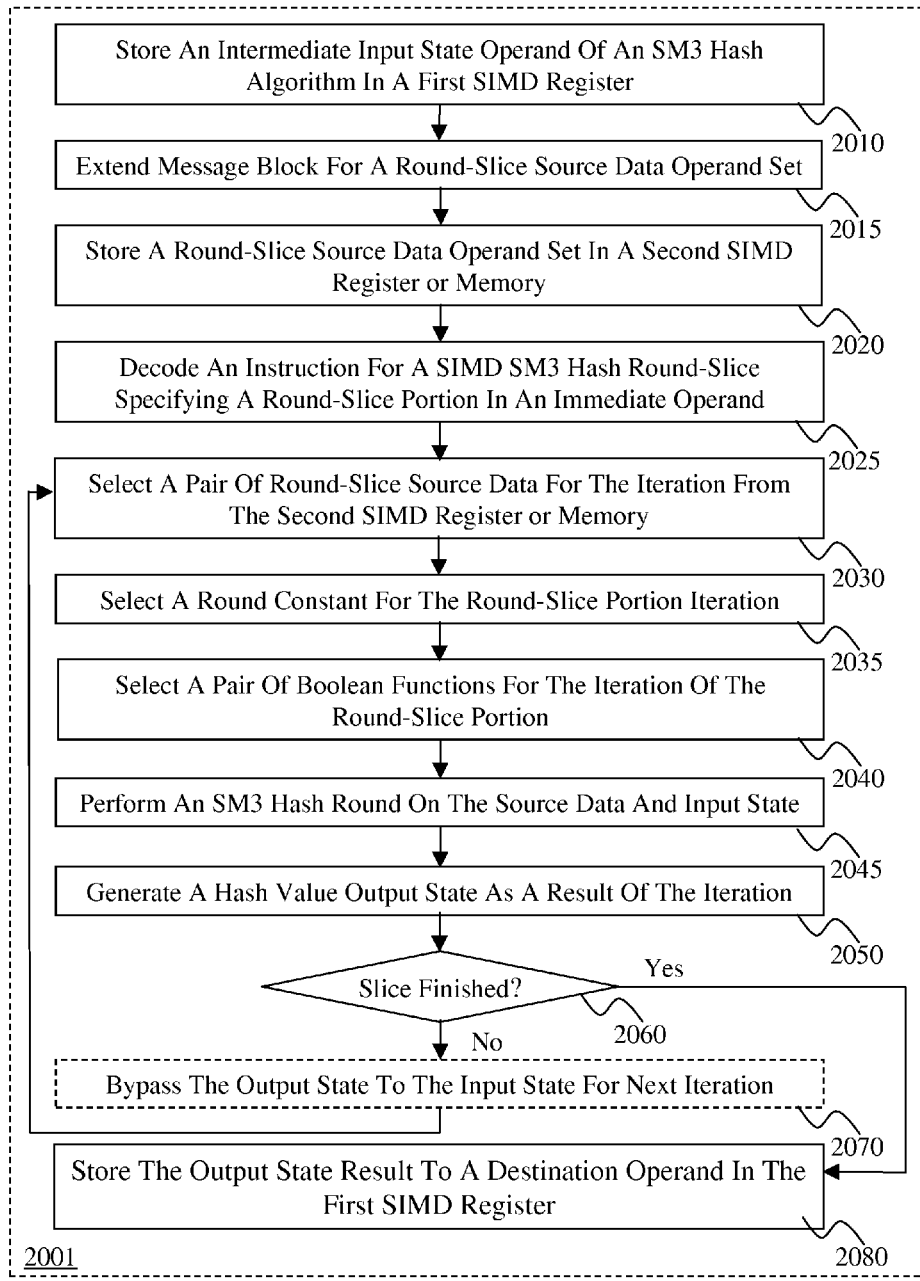
FIG. 20 illustrates a flow diagram for another embodiment of a process for execution of an instruction to provide SIMD SM3 cryptographic hashing functionality.

FIG. 20 illustrates a flow diagram for another embodiment of a process 2001 for execution of an instruction to provide SIMD SM3 cryptographic hashing functionality. In processing block 2010 of process 2001 an intermediate hash value input state source operand of an SM3 hash algorithm is stored (e.g. in a first portion of a plurality of m data fields) in a first SIMD vector register. In processing block 2015 a message block is extended for a round-slice source data operand set. In processing block 2020 a source data operand set is stored (e.g. in a second portion of the plurality of m data fields) in a second SIMD vector register or in memory. In processing block 2025 an instruction is decoded for a SIMD SM3 hash round slice portion of an SM3 hashing algorithm, the instruction specifying said round slice portion in an immediate operand. In processing block 2030 a pair of round slice source data (e.g. $W_j$, and $W_{j+4}$) are selected from the second SIMD register or from memory for the current iteration. In processing block 2035 a round constant (e.g. $T_j$) is selected for the current round slice portion iteration. In processing block 2040 a pair of Boolean functions (e.g. $FF_j$, and $GG_j$) are selected for the current iteration. In processing block 2045 an SM3 hash round is performed on the selected source data and the intermediate hash value input state. In processing block 2050 a hash value output state is generated as the result of an iteration of the SIMD SM3 hash round slice. In processing block 2060 a determination is made as to whether or not all iterations of the hash round slice have finished. If not, the output state result is optionally bypassed in processing block 2070 to the input state for a next iteration of the hash round slice and processing reiterates beginning in processing block 2030. Otherwise processing proceeds to processing block 2080 where the hash value output state result is stored to a destination operand in the first SIMD register. In some alternative embodiments, the hash value output state result may be stored to a destination operand in a SIMD register other than the first SIMD register, or in memory.

Figure 21:
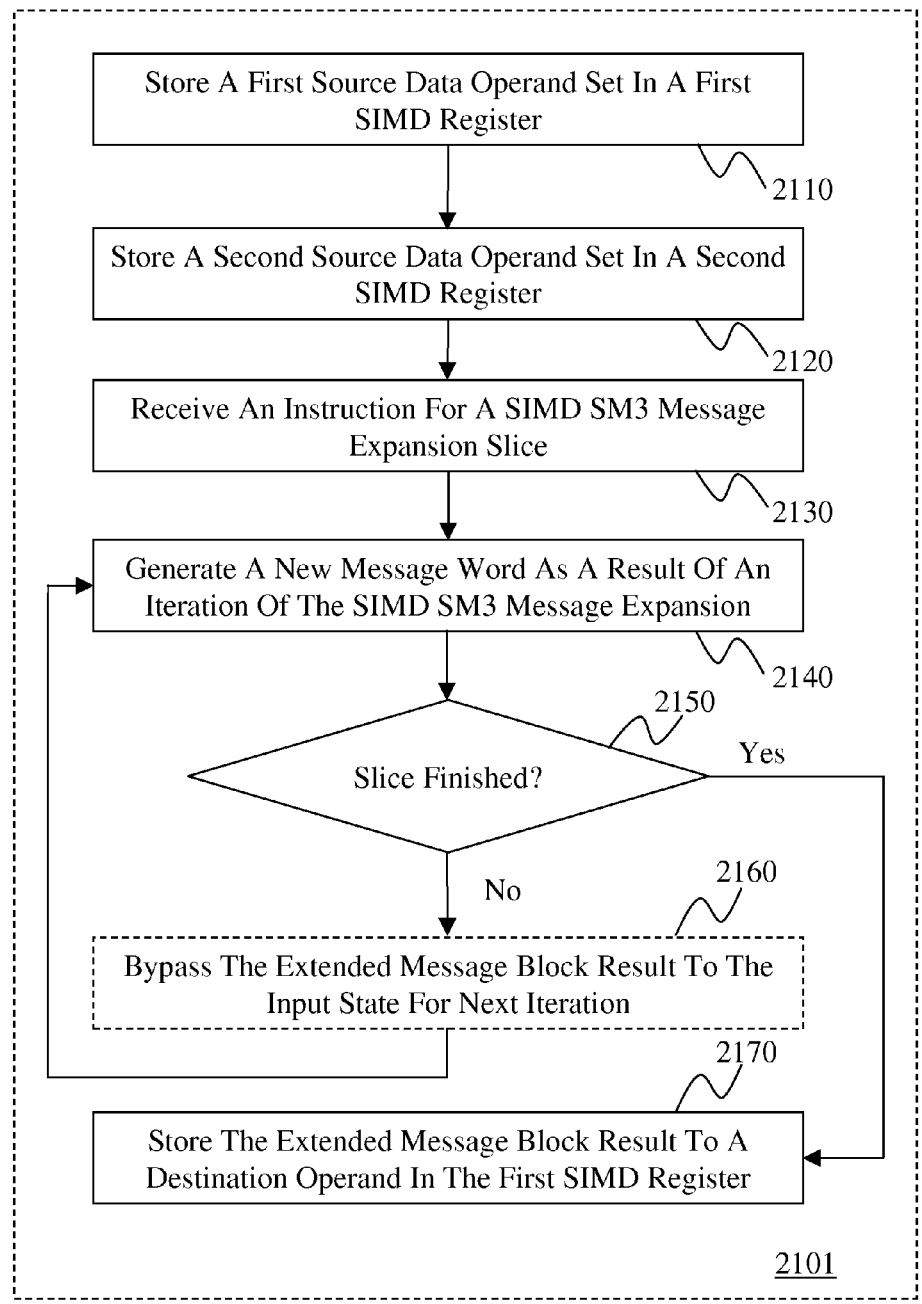
FIG. 21 illustrates a flow diagram for an embodiment of a process for execution of an alternative instruction to provide SIMD SM3 cryptographic hashing functionality.

FIG. 21 illustrates a flow diagram for an embodiment of a process 2101 for execution of an alternative instruction to provide SIMD SM3 cryptographic hashing functionality. In processing block 2110 of process 2101 a first source data operand set of an SM3 hash algorithm is stored (e.g. in a first portion of a plurality of m data fields) in a first SIMD vector register. In processing block 2120 a second source data operand set is stored (e.g. in a second portion of the plurality of m data fields) in a second SIMD vector register. In processing block 2130 an instruction is received for a SIMD SM3 message expansion (or extension) slice of an SM3 hashing algorithm. In processing block 2140 a new message word is generated as the result of an iteration of the SIMD SM3 message expansion slice. In processing block 2150 a determination is made as to whether or not all iterations of the message expansion slice have finished. If not, the extended message block result is optionally bypassed in processing block 2160 to the input state for a next iteration of the message expansion slice and processing reiterates beginning in processing block 2140. Otherwise processing proceeds to processing block 2170 where the extended message block result is stored to a destination operand in the first SIMD register. In some alternative embodiments, the extended message block result may be stored to a destination operand in a SIMD register other than the first SIMD register, or in memory.

It will be appreciated that SIMD SM3 cryptographic hashing instructions, as disclosed herein, may be used to provide SIMD SM3 cryptographic hashing functionality in applications, such as cryptographic protocols and Internet communication to assure data integrity, digital signatures, identity verification, message content authentication and message origin authentication for financial transactions, electronic commerce, electronic mail, software distribution, data storage, random number generation, and so on.

For some embodiments of SIMD instructions and processing logic to provide SM3 cryptographic hashing functionality, both SM3 message expansion and SM3 cryptographic hash rounds may be performed in slices of iterations concurrently and/or in parallel in a standard execution pipeline of a modern microprocessor. It will be appreciated that the number of iterations per slice may be conveniently chosen so as to provide a sufficient cover for other concurrent in-flight instructions by the latencies associated with performing a slice of SM3 message expansions and/or a slice of SM3 cryptographic hash rounds.

Therefore, it will also be appreciated that providing execution of an instruction for a SIMD SM3 cryptographic hashing algorithm round slice, which has a number of iterations (e.g. two, four or eight iterations per slice) but less that the total number of round iterations of the hash algorithm, permits concurrent execution of other instructions (e.g. SM3 message expansion instructions) in a superscalar execution pipeline, and/or an out-of-order processor pipeline, thereby significantly improving processing throughput for a large number of applications, and leveraging the scaling of frequencies for fabrication process improvements associated with general purpose processors.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
a plurality of vector registers each having at least 128-bits;
a decode stage to decode a first instruction for a single instruction multiple data (SIMD) SM3 hash round slice, the first instruction to specify a round-slice portion of an SM3 hash algorithm, an intermediate hash value input operand, a source data operand set, and a round constant operand set that is to include at least one pre-rotated round constant, wherein at least one of the intermediate hash value input operand, the source data operand set, and the round constant operand set are to be stored in the plurality of vector registers; and
one or more execution units coupled with the plurality of vector registers and coupled with the decode stage, the one or more execution units, responsive to the decoded first instruction, to:
perform an SM3 hash round-slice set of round iterations upon the source data operand set, including to apply the intermediate hash value input operand and the round constant operand set; and store a result of the first instruction in a destination vector register of the plurality of vector registers.

2. The processor of claim 1, wherein the first instruction is to specify said destination vector register also for the intermediate hash value input operand.

3. The processor of claim 1, wherein the first instruction is to specify said round-slice portion of the SM3 hash algorithm by a first field in an immediate operand.

4. The processor of claim 3, wherein the first instruction is to specify said round constant operand set at least in part by a second field in the immediate operand.

5. The processor of claim 4, wherein the first instruction further is to specify a Boolean function $FF_j$ and $GG_j$ selector in the immediate operand.

6. The processor of claim 1, wherein the first instruction is to specify said round-slice portion of the SM3 hash algorithm in a first instruction opcode to be four rounds.

7. The processor of claim 6, wherein said round constant operand set is to include four pre-rotated 32-bit constant values.

8. The processor of claim 1, wherein the first instruction is to specify said round-slice portion of the SM3 hash algorithm in a first instruction opcode to be two rounds.

9. The processor of claim 1, wherein the first instruction is to specify said round-slice portion of the SM3 hash algorithm in a first instruction opcode to be one round.

10. The processor of claim 1, wherein the first instruction is to specify said source data operand set as a destination that is to include eight 32-bit values.

11. The processor of claim 1, wherein the first instruction is to specify said source data operand set as a memory location that is to include eight 32-bit values.

12. The processor of claim 1, wherein the first instruction is to specify said source data operand set as two vector registers of the plurality of vector registers each to include four 32-bit values.

13. The processor of claim 1, wherein the first instruction is to specify said round-slice portion of the SM3 hash algorithm by a first field in an immediate operand to store a round number between 0 and 63 and by a second field to store an iteration count between 0 and 3.

14. The processor of claim 1, wherein the first instruction is to specify said round-slice portion of the SM3 hash algorithm to be four rounds.

15. The processor of claim 1, wherein the first instruction is to specify said round-slice portion of the SM3 hash algorithm to be one round.

16. The processor of claim 1, wherein the first instruction is to specify said round-slice portion of the SM3 hash algorithm to be any one of a plurality of different possible numbers of rounds.

17. A processor comprising:
a plurality of vector registers each to have at least 128-bits;
a decode stage to decode a first instruction for a single instruction multiple data (SIMD) SM3 message expansion, the first instruction to specify a first source data operand set, a second source data operand set, and an expansion extent as one of a plurality of different possible expansion extents, wherein at least one of the first source data operand set and the second source data operand set are to be within the plurality of vector registers; and
one or more execution units coupled with the decode stage and coupled with the plurality of vector registers, the one or more execution units, responsive to the decoded first instruction, to:
perform a number of SM3 message expansions from the first and second source data operand sets, the number of SM3 message expansions to be determined by the expansion extent; and
store a result of the first instruction in a destination vector register of the plurality of vector registers.

18. The processor of claim 17, wherein the first instruction is to have a field to specify said destination vector register as a destination operand.

19. The processor of claim 17, wherein the first instruction is to specify said first and second source data operand sets as two vector registers of the plurality of vector registers each to include eight 32-bit values.

20. The processor of claim 17, wherein the first instruction is to specify said expansion extent by a first field in an immediate operand.

21. The processor of claim 17, wherein the first instruction is to specify said expansion extent in a first instruction opcode to indicate a message expansion of four new 32-bit words.

22. The processor of claim 21, wherein the message expansion for one of the four new 32-bit words is to use one other of the four new 32-bit words in addition to the first and second source data operand sets.

23. The processor of claim 17, wherein the first instruction is to specify said expansion extent in a first instruction opcode to indicate a message expansion of two new 32-bit words.

24. The processor of claim 17, wherein the first instruction is to specify said expansion extent in a first instruction opcode to indicate a message expansion of one new 32-bit word.

25. The processor of claim 17, wherein the first instruction is to specify said expansion extent in a first instruction opcode to indicate a message expansion of four new 32-bit words.

26. A method comprising:
receiving from a first portion of a plurality of m data fields of a first vector register of a plurality of vector registers each having at least 128-bits, an intermediate hash value input state source operand of an SM3 hash algorithm;
receiving from a second portion of a plurality of m data fields of a second vector register of the plurality of vector registers, a source data operand set;
executing, with an execution unit in a processor, a single instruction multiple data (SIMD) instruction for an SM3 hash-round-slice portion of the SM3 hash algorithm having a plurality of iterations less that a total number of round iterations of the SM3 hash algorithm using at least one pre-rotated round constant specified by the SIMD instruction; and
for each iteration of the SM3 hash-round-slice portion, generating a result of an iteration, storing a hash value output state generated as the result of the iteration, and bypassing the hash value output state to the intermediate hash value input state for each next iteration of the plurality of iterations.

27. The method of claim 26 further comprising:
receiving from a third portion of a plurality of m data fields of a third vector register, a round constant operand set; and
for each iteration of the SM3 hash-round-slice portion, reading a respective round constant, $T_j$, of the round constant operand set and adding the respective round constant with a left-rotated respective data field, A, of the first vector register and a second unrotated data field, E, of the first vector register.

28. The method of claim 27 wherein said third portion comprises four of the plurality of m data fields of the third vector register, and each round constant, $T_j$, of the stored round constant operand set is pre-rotated left by j bits.

29. The method of claim 26 further comprising:
for each iteration of the SM3 hash-round-slice portion, reading a respective data field, $W_j$, of the second vector register and XORing the respective data field of the second vector register with a second data field, $W_{j+4}$, of the second vector register.

30. The method of claim 29 wherein said second portion comprises eight of the plurality of m data fields of the second vector register.

31. The method of claim 26 wherein said first portion comprises eight of the plurality of m data fields of the first vector register.

32. The method of claim 26 wherein the SIMD instruction specifies said SM3 hash-round-slice portion of the SM3 hash algorithm by a first field in an immediate operand.

33. The method of claim 32 wherein the SIMD instruction specifies a round constant operand set at least in part by a second field in the immediate operand.

34. The method of claim 33 wherein the SIMD instruction further specifies a Boolean function $FF_j$ and $GG_j$ selector in the immediate operand.

35. A method comprising:
receiving from a first portion of a plurality of m data fields of a first vector register of a plurality of vector registers each having at least 128-bits, a first source data operand set;
receiving from a second portion of a plurality of m data fields of a second vector register of the plurality of vector registers, a second source data operand set;
executing, with an execution unit in a processor, a single instruction multiple data (SIMD) instruction specifying an expansion extent for an SM3 message-expansion-slice portion for an SM3 hash algorithm including performing a number of SM3 message expansions from the first and second source data operand sets, the number of SM3 message expansions being determined by the specified expansion extent, wherein the specified expansion extent is able to be any one of a plurality of different possible expansion extents; and
storing a result of the SIMD instruction in a destination vector register of the plurality of vector registers.

36. The method of claim 29, wherein the SIMD instruction specifies said first and second source data operand sets as two vector registers each comprising eight 32-bit values.

37. The method of claim 29, wherein the SIMD instruction specifies said expansion extent by a first field in an immediate operand.

38. The method of claim 29, wherein the SIMD instruction specifies said expansion extent in a first instruction opcode to indicate a message expansion of four new 32-bit words.

39. The method of claim 38, wherein the message expansion for one of the four new 32-bit words uses one other of the four new 32-bit words in addition to the first and second source data operand sets.

40. A processing system comprising:
a memory to store a first instruction for a single instruction multiple data (SIMD) SM3 hash algorithm round slice, and a second instruction for an SM3 message expansion slice for an SM3 hash algorithm; and
a processor comprising:
a plurality of vector registers each to have at least 128-bits;
an instruction fetch stage to fetch the first instruction;
a decode stage to decode the first instruction, the first instruction to specify a round slice portion of the SM3 hash algorithm, an intermediate hash value input operand, a round-slice source data operand set, and a round constant operand set that is to include at least one pre-rotated round constant, wherein at least one of the intermediate hash value input operand, the round-slice source data operand set, and the round constant operand set are to be stored in the plurality of vector registers;
the decode stage to decode the second instruction, the second instruction to specify a first source data operand set, a second source data operand set, and an expansion extent as any one of a plurality of different possible expansion extents; and
one or more execution units coupled with the decode stage and coupled with the plurality of vector registers, the one or more execution units, responsive to the decoded first instruction, to:
perform an SM3 hash round-slice set of round iterations upon the round-slice source data operand set, including to apply the intermediate hash value input operand and the round constant operand set, and to store a first result of the first instruction in a first destination register of the plurality of vector registers; and
the one or more execution units, responsive to the decoded second instruction, to:
perform a number of SM3 message expansions from the first and second source data operand sets, the number of SM3 message expansions to be determined by the expansion extent, and to store a second result of the second instruction in a second destination vector register of the plurality of vector registers.

41. The processing system of claim 40, wherein the first instruction is to specify said round-slice portion of the SM3 hash algorithm by a first field in an immediate operand.

42. The processing system of claim 40, wherein the first instruction is to specify said round constant operand set at least in part by a second field in the immediate operand.

43. The processing system of claim 42, wherein the first instruction further is to specify a Boolean function $FF_j$ and $GG_j$ selector in the immediate operand.

44. The processing system of claim 40, wherein the first instruction is to specify said round-slice portion of the SM3 hash algorithm in a first instruction opcode to be four rounds.

45. The processing system of claim 44, wherein said round constant operand set is to include an initial pre-rotated 32-bit constant value.

46. The processing system of claim 45, wherein said round constant operand set is to include four pre-rotated 32-bit constant values.

47. The processing system of claim 40, wherein the second instruction is to specify said first and second source data operand sets as two SIMD registers each to include eight 32-bit values.

48. The processing system of claim 40, wherein the second instruction is to specify said expansion extent by a first field in an immediate operand.

49. The processing system of claim 40, wherein the second instruction is to specify said expansion extent in a first instruction opcode to indicate a message expansion of four new 32-bit words.

* * * * *